(12) United States Patent  
Klein et al.

(10) Patent No.: US 12,073,067 B2  
(45) Date of Patent: Aug. 27, 2024

(54) USER INTERFACE TRANSITIONS AND OPTIMIZATIONS FOR FOLDABLE COMPUTING DEVICES

(71) Applicant: MICROSOFT TECHNOLOGY LICENSING, LLC, Redmond, WA (US)

(72) Inventors: Christian Klein, Duvall, WA (US); Peter Hammerquist, Shoreline, WA (US); Ryan Pendlay, Bellevue, WA (US); Albert Peter Yih, Seattle, WA (US); Lauren Edelmeier, Seattle, WA (US); Christoffer Peter Hart Hansen, Seattle, WA (US); Diego David Baca Del Rosario, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/480,537

(22) Filed: Sep. 21, 2021

(65) Prior Publication Data

US 2022/0005388 A1 Jan. 6, 2022

Related U.S. Application Data

(63) Continuation of application No. 17/478,590, filed on Sep. 17, 2021, and a continuation of application No.  
(Continued)

(51) Int. Cl.  
*G06F 3/04845* (2022.01)  
*G06F 1/16* (2006.01)  
(Continued)

(52) U.S. Cl.  
CPC ........ *G06F 3/04845* (2013.01); *G06F 1/1652* (2013.01); *G06F 3/048* (2013.01);  
(Continued)

(58) Field of Classification Search  
CPC .... G06F 3/04845; G06F 1/1652; G06F 3/041; G06F 3/048; G06F 3/04883;  
(Continued)

(56) References Cited

U.S. PATENT DOCUMENTS 5,617,526 A 4/1997 Oran et al.  
7,429,993 B2 9/2008 Hui et al.  
(Continued)

FOREIGN PATENT DOCUMENTS

CN 108446065 A 8/2018  
CN 109582207 A 4/2019  
(Continued)

OTHER PUBLICATIONS

"Non Final Office Action Issued in U.S. Appl. No. 17/478,590", Mailed Date: Sep. 27, 2022, 15 Pages.  
(Continued)

*Primary Examiner* — Justin R. Blaufeld  
(74) *Attorney, Agent, or Firm* — Newport IP, LLC; Jacob P. Rohwer

(57) ABSTRACT

A foldable computing device can be configured to provide a user interface (UI) optimization that enables an application window to be presented in a predictable location when an application is launched, a UI optimization that enables an application window to be moved to an active display area, a UI optimization that enables a modal UI element to be presented in such a way that it does not overlap a seam on the device, a UI optimization that enables an image presented by the device to be adjusted to maintain a view of the focal point of the image across device posture or orientation  
(Continued)

changes, a UI optimization that enables the device to transition between UI modes optimized for front-facing and world-facing image capture, and/or a UI optimization that enables the device to provide a UI for instructing a user to flip the device when a biometric sensor is in use.

12 Claims, 17 Drawing Sheets

Related U.S. Application Data

16/726,181, filed on Dec. 23, 2019, now Pat. No. 11,127,321.

(60) Provisional application No. 62/909,201, filed on Oct. 1, 2019.

(51) Int. Cl.
*G06F 3/048* (2013.01)
*G06F 3/0481* (2022.01)
*G06F 3/04886* (2022.01)
*G09F 9/30* (2006.01)

(52) U.S. Cl.
CPC ........ *G06F 3/0481* (2013.01); *G06F 3/04886* (2013.01); *G09F 9/301* (2013.01); *G06F 2203/04803* (2013.01); *G09G 2354/00* (2013.01); *G09G 2380/02* (2013.01)

(58) Field of Classification Search
CPC . G06F 2203/04803; G06F 2203/04806; G06F 9/451; G06F 3/0486; G06F 3/0481; G06F 1/1681; G06F 1/1641; G09F 9/301; G09G 2354/00; G09G 2380/02
See application file for complete search history.

(56) References Cited

U.S. PATENT DOCUMENTS

| | | | |
|---|---|---|---|
| 7,681,143 B2 | 3/2010 | Lindsay et al. | |
| 9,710,133 B2 | 7/2017 | Matthews et al. | |
| 10,514,727 B2* | 12/2019 | Seo | G06F 3/04886 |
| 11,079,995 B1 | 8/2021 | Hulbert et al. | |
| 11,119,651 B2 | 9/2021 | Liang | |
| 11,127,321 B2* | 9/2021 | Klein | G06F 3/048 |
| 11,137,894 B1* | 10/2021 | Chen | G06F 1/1643 |
| 11,138,912 B2* | 10/2021 | Klein | G06F 1/1694 |
| 11,676,518 B2* | 6/2023 | Kambhatla | G09G 3/035 345/1.3 |
| 2003/0189597 A1* | 10/2003 | Anderson | G06F 3/0481 715/778 |
| 2004/0049743 A1* | 3/2004 | Bogward | G06F 1/1626 715/262 |
| 2006/0123353 A1 | 6/2006 | Matthews et al. | |
| 2007/0006094 A1* | 1/2007 | Canfield | G06Q 10/107 715/842 |
| 2007/0094341 A1 | 4/2007 | Bostick et al. | |
| 2008/0155454 A1 | 6/2008 | Balasubramanian et al. | |
| 2010/0060664 A1* | 3/2010 | Kilpatrick, II | G06F 1/1684 345/1.3 |
| 2010/0085274 A1* | 4/2010 | Kilpatrick, II | G06F 1/1641 345/1.3 |
| 2010/0182265 A1* | 7/2010 | Kim | G06F 1/1641 345/1.3 |
| 2010/0248788 A1* | 9/2010 | Yook | G06F 3/04886 455/566 |
| 2011/0175930 A1* | 7/2011 | Hwang | G06F 3/04886 345/660 |
| 2011/0209058 A1* | 8/2011 | Hinckley | G06F 1/1647 715/761 |
| 2011/0285631 A1* | 11/2011 | Imamura | G06F 3/0481 345/168 |
| 2012/0081309 A1* | 4/2012 | Sirpal | G06F 1/1647 345/173 |
| 2012/0084694 A1* | 4/2012 | Sirpal | G06F 3/0346 715/769 |
| 2012/0169598 A1 | 7/2012 | Grossman et al. | |
| 2013/0057572 A1* | 3/2013 | Anderson | G06F 9/451 345/619 |
| 2013/0067392 A1* | 3/2013 | Leonard | G06F 3/0485 715/781 |
| 2013/0067394 A1 | 3/2013 | Nan et al. | |
| 2013/0300697 A1* | 11/2013 | Kim | G06F 1/1626 345/173 |
| 2013/0321340 A1* | 12/2013 | Seo | G06F 3/1438 345/174 |
| 2014/0028596 A1* | 1/2014 | Seo | G06F 3/0487 345/173 |
| 2014/0101535 A1* | 4/2014 | Kim | G06F 3/04886 715/761 |
| 2014/0218321 A1* | 8/2014 | Lee | G06F 1/1677 345/173 |
| 2015/0015511 A1* | 1/2015 | Kwak | G06F 3/04847 345/173 |
| 2015/0227224 A1* | 8/2015 | Park | G06F 3/0488 345/173 |
| 2015/0227225 A1* | 8/2015 | Park | G06F 1/1677 345/173 |
| 2015/0325216 A1* | 11/2015 | Park | G06F 1/16 345/634 |
| 2015/0331593 A1* | 11/2015 | Lee | G06F 1/1641 345/667 |
| 2015/0338888 A1* | 11/2015 | Kim | G06F 1/1677 345/156 |
| 2016/0077685 A1* | 3/2016 | Fang | G06F 9/452 715/778 |
| 2016/0139685 A1* | 5/2016 | Yang | G06F 3/1446 345/173 |
| 2016/0184700 A1* | 6/2016 | Lee | G06F 3/04847 463/31 |
| 2016/0191680 A1* | 6/2016 | Jung | G09G 3/03 455/575.1 |
| 2016/0195938 A1* | 7/2016 | Kim | G06F 1/1626 345/156 |
| 2016/0357221 A1* | 12/2016 | Huh | G06F 3/0487 |
| 2017/0315686 A1 | 11/2017 | Matthews et al. | |
| 2018/0039408 A1* | 2/2018 | Cheong | G06F 3/0481 |
| 2018/0329580 A1* | 11/2018 | Aurongzeb | G09G 3/035 |
| 2018/0374452 A1* | 12/2018 | Choi | G06F 3/04886 |
| 2019/0018454 A1* | 1/2019 | Jung | H04M 1/0214 |
| 2019/0042066 A1* | 2/2019 | Kim | H04M 1/725 |
| 2019/0043066 A1 | 2/2019 | Umezu et al. | |
| 2019/0278336 A1* | 9/2019 | Choi | G06F 1/1641 |
| 2020/0249820 A1* | 8/2020 | Choi | G06F 3/04886 |
| 2020/0278720 A1* | 9/2020 | Kim | G06F 1/1652 |
| 2020/0365110 A1* | 11/2020 | Iyer | G06F 3/147 |
| 2021/0096675 A1* | 4/2021 | Klein | G06F 1/1694 |
| 2021/0097901 A1* | 4/2021 | Klein | G06F 1/1694 |
| 2021/0263564 A1* | 8/2021 | Chen | H04N 21/41407 |
| 2021/0311683 A1* | 10/2021 | Jin | G06F 3/1423 |
| 2021/0357169 A1 | 11/2021 | Hulbert et al. | |
| 2022/0005387 A1* | 1/2022 | Klein | G06F 1/1694 |
| 2022/0122514 A1* | 4/2022 | Kwon | G06F 1/1677 |
| 2022/0129037 A1 | 4/2022 | Ito et al. | |
| 2022/0291811 A1* | 9/2022 | Zhang | G06F 1/1652 |
| 2022/0291818 A1* | 9/2022 | Lee | G06F 3/0481 |

FOREIGN PATENT DOCUMENTS

| | | | | |
|---|---|---|---|---|
| CN | 110012154 A | | 7/2019 | |
| CN | 111124561 A | * | 5/2020 | ......... G06F 3/04847 |
| KR | 20150094481 A | * | 8/2015 | ............... G06F 3/01 |
| KR | 1020180041650 A | * | 4/2018 | |

OTHER PUBLICATIONS

"IEEE 100—The Authoritative Dictionary of IEEE Standard Terms—Seventh Edition", Published by Standards Information Network, IEEE Press, Dec. 11, 2000, 3 Pages.

(56) References Cited

OTHER PUBLICATIONS

"Microsoft Computer Dictionary—Fifth Edition", Published by Microsoft Press, May 1, 2002, 4 Pages.
"Final Office Action Issued in U.S. Appl. No. 17/478,590", Mailed Date: Mar. 22, 2023, 15 Pages.
"Non Final Office Action Issued in U.S. Appl. No. 17/478,590", Mailed Date: Aug. 3, 2023, 11 Pages.
"First Office Action and Search Report Issued in Chinese Patent Application No. 202080069086.7", Mailed Date: Sep. 20, 2023, 13 Pages.
Notice of Allowance mailed on Jan. 31, 2024, in U.S. Appl. No. 17/478,590, 10 pages.
Rejection Decision Received for Chinese Application No. 202080069086.7, mailed on Apr. 15, 2024, 12 pages.

* cited by examiner

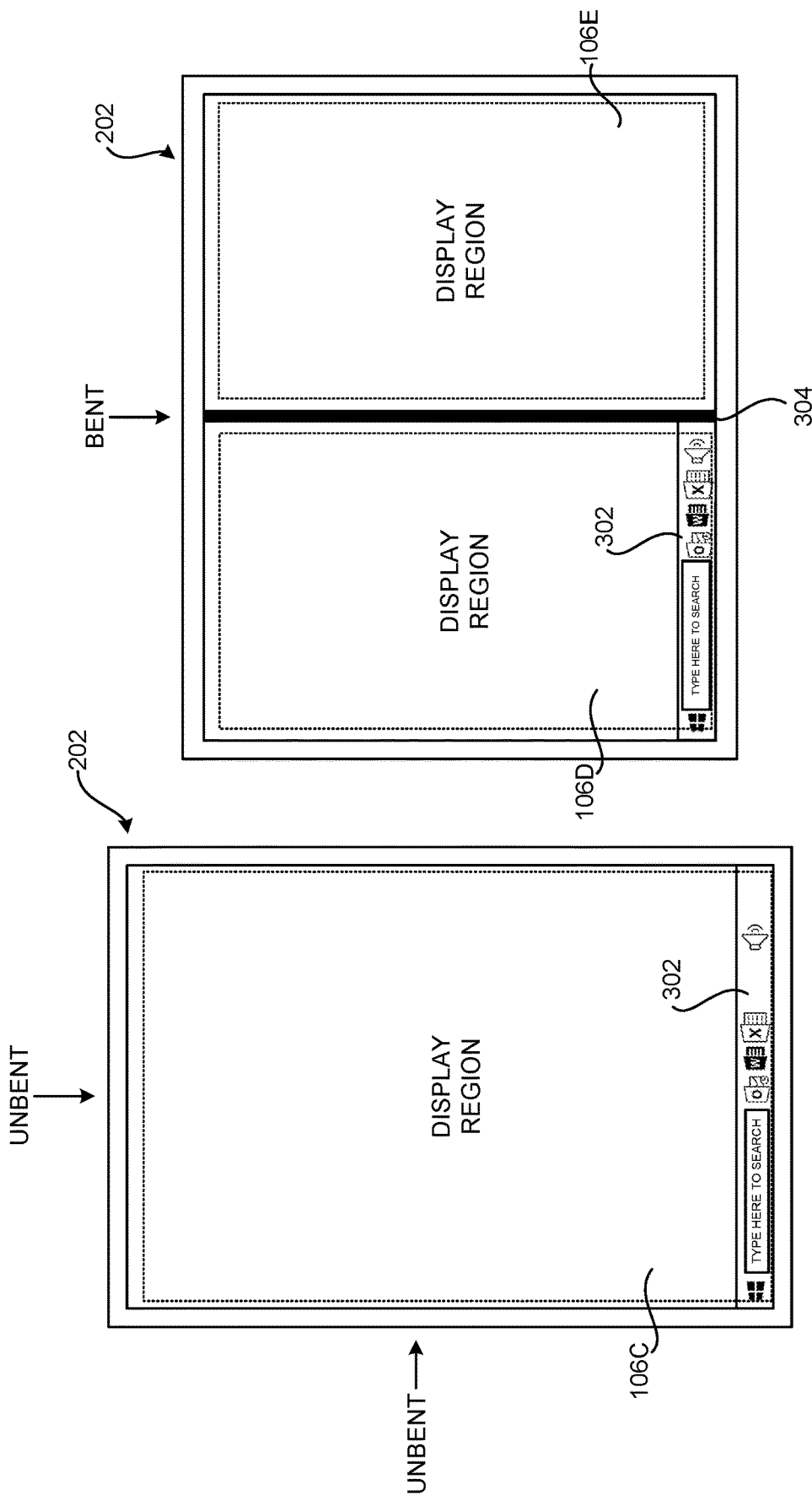

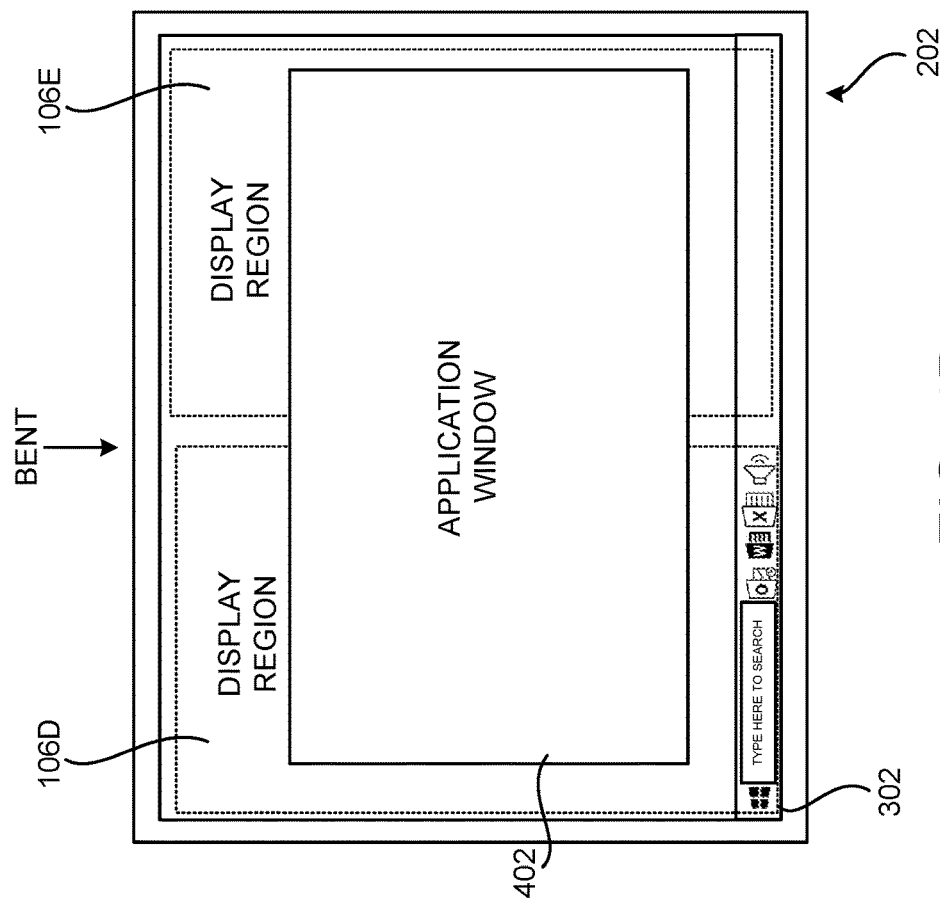
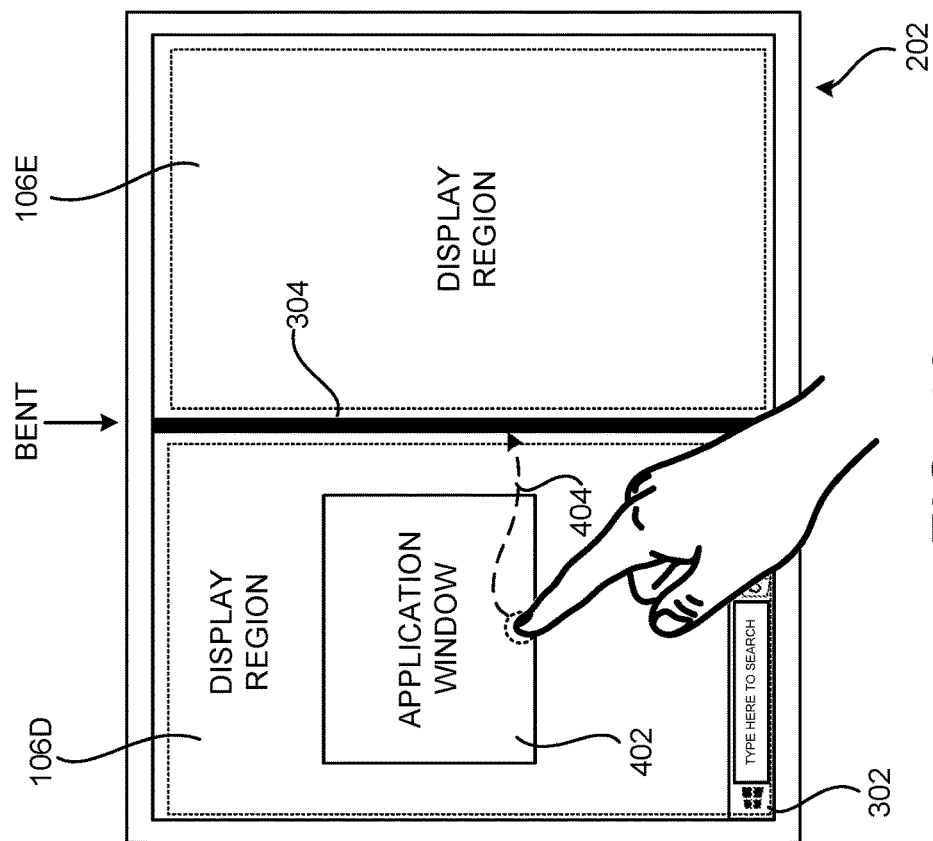
FIG. 4B
FIG. 4A

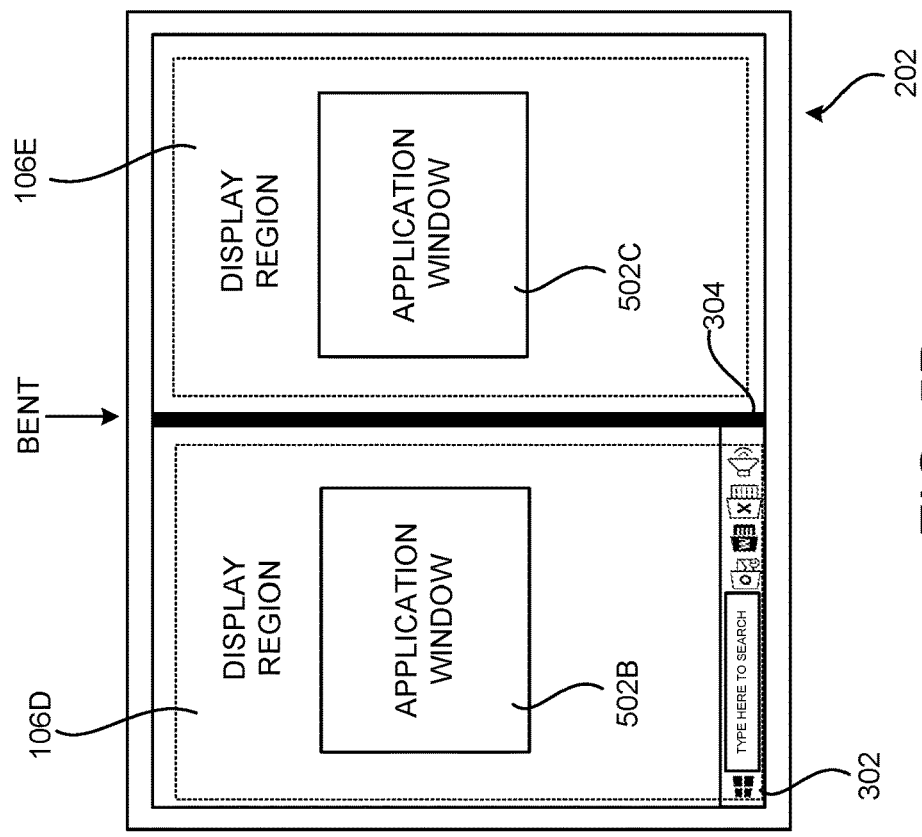
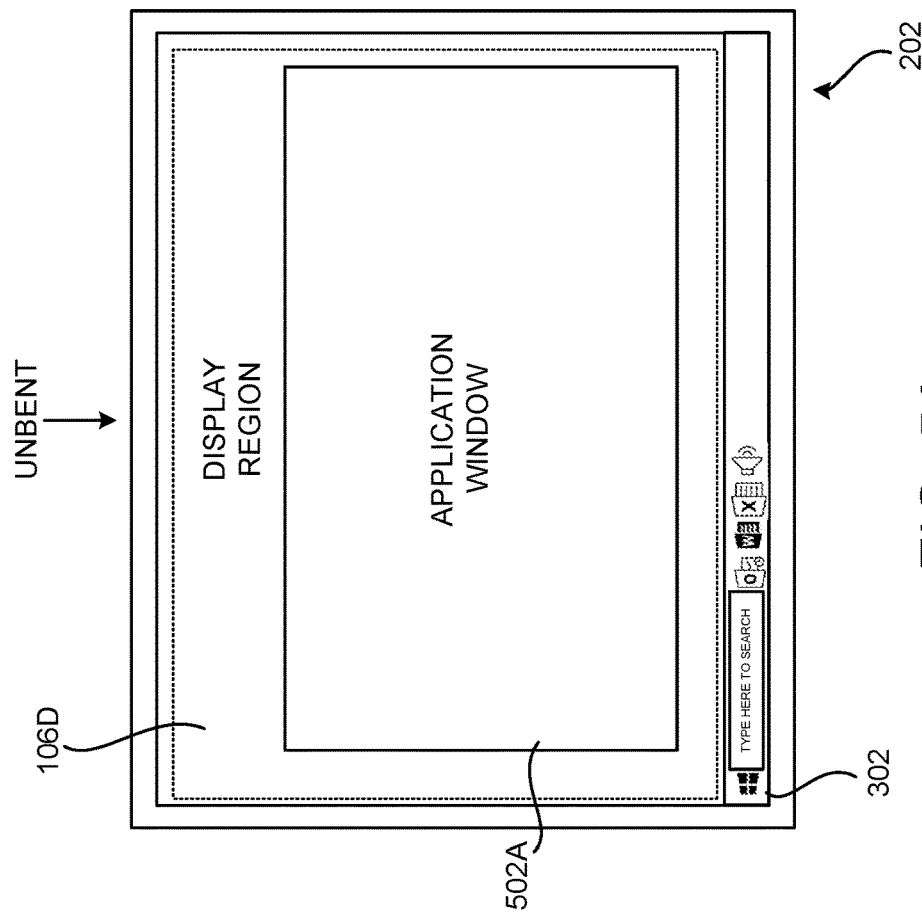
FIG. 5B
FIG. 5A

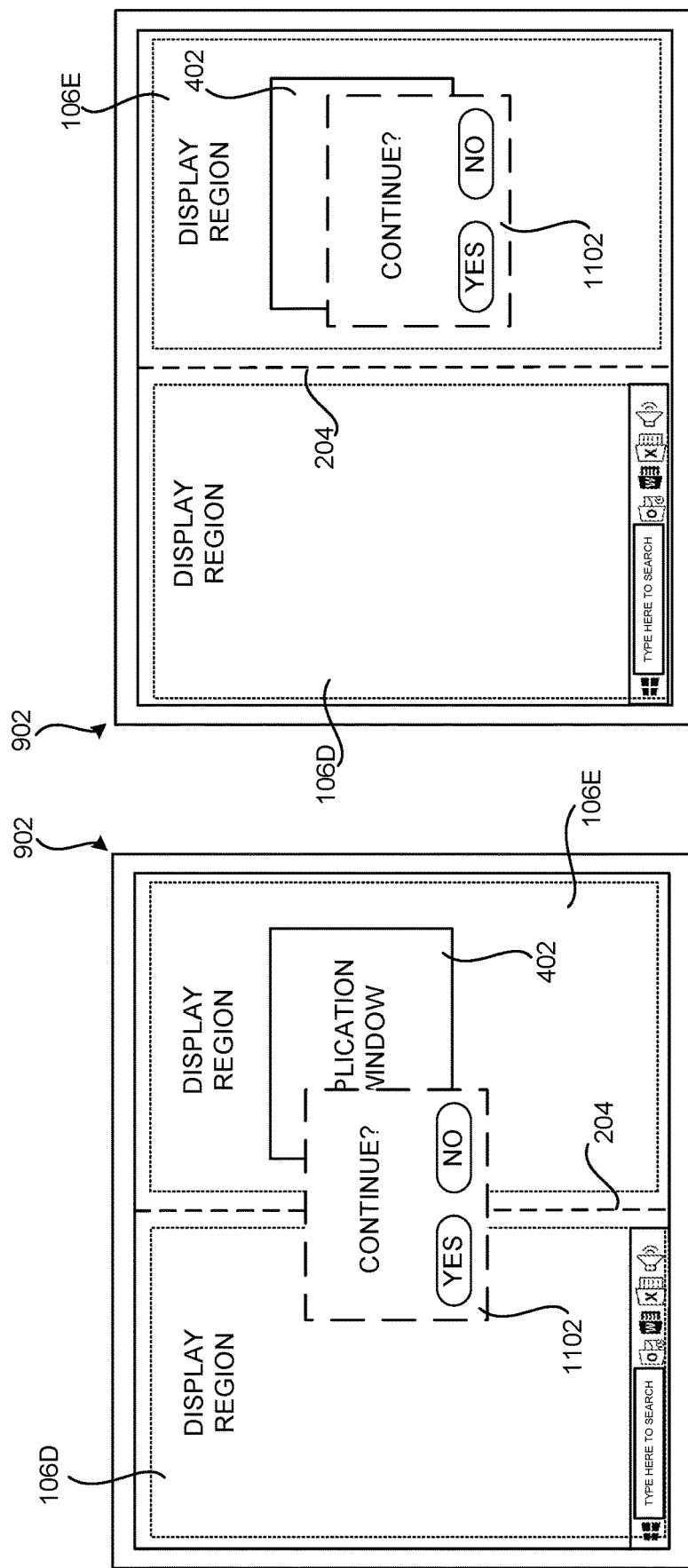

USER INTERFACE TRANSITIONS AND OPTIMIZATIONS FOR FOLDABLE COMPUTING DEVICES

CROSS-REFERENCE TO RELATED APPLICATIONS

This application is a continuation of U.S. patent application Ser. No. 17/478,590, filed Sep. 17, 2021, which claims priority to U.S. patent application Ser. No. 16/726,181, filed Dec. 23, 2019, which claims priority to U.S. Provisional Patent Application No. 62/909,201, entitled "DYNAMIC SCREEN MODES, TRANSITIONS, AND OPTIMIZATIONS FOR FOLDABLE COMPUTING DEVICES," which was filed on Oct. 1, 2019, which are expressly incorporated herein by reference in their entirety.

BACKGROUND

Foldable computing devices include devices with two screens joined with a hinge ("hinged computing devices") or devices with bendable screens ("bendable computing devices"). These types of devices can provide benefits over traditional computing devices such as laptop computers. Commonly, however, these devices implement user interface ("UP") paradigms originally designed for computing devices with traditional form factors. As a result, UIs provided by foldable computing devices can be cumbersome and error-prone, which can lead to incorrect or inadvertent user input and unnecessary consumption of computing resources.

It is with respect to these and other technical challenges that the disclosure made herein is presented.

SUMMARY

Technologies are disclosed herein for providing UI transitions and optimizations for foldable computing devices. Through implementations of the disclosed technologies, UIs can be provided by foldable devices that are easier to utilize and that result in fewer user input errors. Additionally, the utilization of computing resources by foldable computing devices can be reduced by avoiding the processing associated with inefficient navigation of a UI and inadvertent or incorrect user input. Other technical benefits not specifically mentioned herein can also be realized through implementations of the disclosed subject matter.

In one embodiment, a foldable computing device can be configured to provide a UI optimization that enables an application window to be presented in a predictable location when an application is launched. In particular, the foldable computing device can receive a request to launch an application, for instance by way of a selection of an icon corresponding to the application. In response to receiving the request, the foldable computing device can select the active display region which, in one embodiment, is a display region that contains the taskbar. The foldable computing device can then launch the application such that an application window displayed by the application is presented in the selected display region.

In another embodiment, the foldable computing device provides a UI optimization that enables an application window to be moved to an active display area. In this embodiment, the foldable computing device detects the selection of a display region-specific UI control such as, for example, an icon associated with the application that is displayed in the taskbar, a launcher UI control, a UI control in a task view UI, or a UI control in a UI for presenting notifications from the application.

In response to detecting the selection of the display region-specific UI control, the foldable computing device determines if the application window is displayed in a non-active display region (e.g. a display region not displaying a taskbar). If the application window is displayed in a non-active display region, the foldable computing device moves the application window to the active display region.

When the foldable computing device detects the selection of the display region-specific UI control, the foldable computing device might also, or alternately, determine if the application window is not visible (e.g. the window is minimized or hidden) within any of the plurality of display regions. If the application window is not visible, the foldable computing device can cause the application window to be displayed in the active display region.

In another embodiment, the foldable computing device provides a UI optimization that enables a modal UI element to be presented in such a way that it does not overlap a seam on the foldable computing device. In this embodiment, the foldable computing device can determine if a modal UI element is to be displayed over a seam of the foldable computing device. If the modal UI element is to be displayed over the seam, the foldable computing device can select one of a plurality of display regions provided by the foldable computing device. The display region can be selected based upon the percentage of the modal UI element that overlaps each of the plurality of display regions, an affinity of content in the modal UI element to content currently displayed in each of the plurality of display regions, or another factor or factors. The foldable computing device can then display the modal UI element in the selected display region such that it does not overlap the seam.

In another embodiment, the foldable computing device provides a UI optimization that enables an image presented by the foldable computing device to be adjusted to maintain a view of the focal point of the image across device posture and orientation changes. In this embodiment, the foldable computing device can be configured in an unbent posture in a landscape orientation, whereby the foldable computing device presents a first display region and a second display region. The foldable computing device can display a background image in this posture such that a focal point of the background image is displayed in either the first region or the second region. The focal point in the image might be identified using machine learning techniques, might be user-specified, or might be identified in another manner.

If the foldable computing device is reconfigured in a folded posture wherein only one of the display regions is visible at a time, the device can determine whether the focal point of the image is no longer visible. If the focal point of the image is no longer visible, the foldable computing device can modify the display of the background image such that the focal point of the background image is viewable. For instance, the foldable computing device might move or resize the background image to ensure that the focal point in the image is viewable.

In another embodiment, the foldable computing device provides a UI optimization that enables the foldable device to transition between UI modes optimized for front-facing and world-facing image capture. In this embodiment, the foldable computing device might be configured in a folded posture whereby a first display region is visible on a first side of the device and a second display region is visible on a second side of the device. The foldable computing device includes a single camera located on the first side of the device.

The foldable computing device can also detect that it is in an orientation such that the first side of the device is facing a user of the foldable device. In response thereto, the device can present a user interface for use in taking a still image or video in the first display area. If the foldable device detects that it is in an orientation such that the first side of the foldable device is facing away from the user of the foldable device, it can present a UI for taking a still image or video in the second display area. The orientation of the device can be based upon measurements received from an inertial measurement unit ("IMU"), capacitive signals received from one or more display screens, signals received from the camera, signals received from one or more proximity sensors, signals received from one or more ambient light sensors, or other types of signals.

In another embodiment, the foldable computing device provides a UI optimization that enables the foldable device to provide a UI for instructing a user to flip the device when a biometric sensor is in use but facing away from a user. In this embodiment, the foldable device can be configured in a posture whereby a first display region is visible on a first side of the device and a second display region is visible on a second side of the device. A biometric sensor is located on the first side of the device.

When the foldable computing device receives a request to perform biometric authentication of a user of the device, it can determine whether it is in an orientation such that the first side of the foldable device is facing away from the user of the foldable device (i.e. the biometric sensor is not facing the user). In response thereto, the foldable computing device can present a UI in the second display area (i.e. the display area facing the user) instructing the user to reorient the device such that the first side of the foldable device is facing toward the user. Additional details regarding the foldable computing device described briefly above are provided below with regard to FIGS. 9A-15.

It should also be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A and 3B are device user interface diagrams illustrating various adaptations for multiple screen modes of bendable devices, according to one embodiment disclosed herein;

FIGS. 4A and 4B are device user interface diagrams illustrating aspects of a gesture that originates outside the area of an artificial hardware seam and ends inside the area of the artificial hardware seam, according to one embodiment;

FIGS. 5A and 5B are device user interface diagrams illustrating aspects of the operation of a multiple display region-enabled application, according to one embodiment;

FIGS. 11A and 11B are device user interface diagrams illustrating aspects of a UI optimization disclosed herein that enables a modal UI element to be presented in such a way that it does not overlap the seam on a foldable computing device, according to one embodiment;

DETAILED DESCRIPTION

Figure 1B:
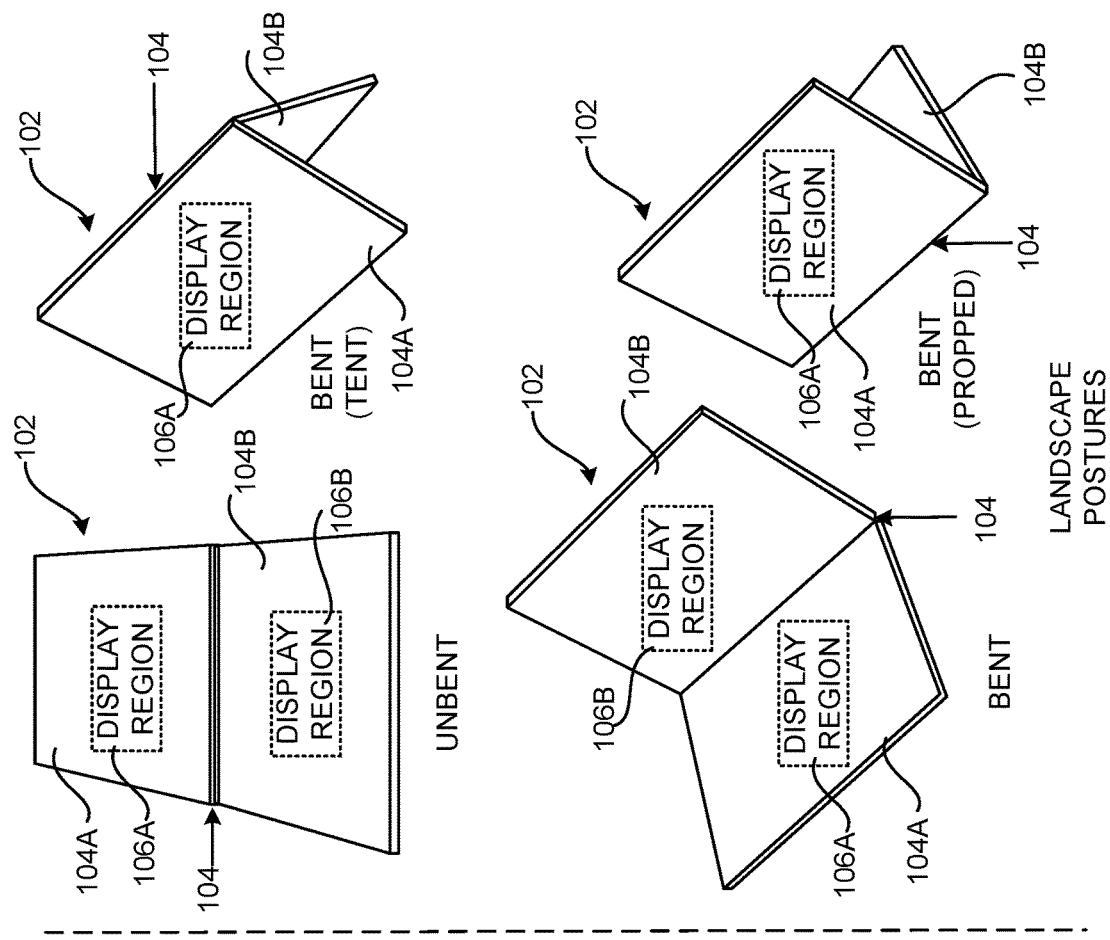
FIGS. 1A and 1B are device posture diagrams illustrating aspects of the configuration and operation of a hinged computing device that implements the disclosed technologies in one particular configuration.

The following detailed description is directed to technologies for UI optimizations and transitions on a foldable computing device. As discussed briefly above, implementations of the disclosed technologies can enable UIs to be provided on foldable computing devices that are easier to utilize and that result in fewer user input errors. Consequently, the utilization of computing resources can be reduced by avoiding the processing associated with inefficient navigation of a UI and inadvertent or incorrect user input, as compared to previous solutions. Other technical benefits not specifically mentioned herein can also be realized through implementations of the disclosed subject matter.

Those skilled in the art will recognize that the subject matter disclosed herein can be implemented with various types of computing systems and modules, at least some of which are described in detail below. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), computing or processing systems embedded in devices (such as wearable computing devices, automobiles, home automation etc.), and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for providing UI transitions and optimizations on a foldable computing device will be described.

Prior to discussing particular aspects of the disclosed technologies, a brief introduction to foldable computing devices (which might be referred to herein as "foldable devices") will be provided. As discussed briefly above, foldable devices include multiple screen form factor devices (which might be referred to herein as "hinged devices") that have two physical display screens joined together with a hinge or other equivalent mechanism. By manipulating the orientation of the display screens with respect to one another by way of the hinge, such devices can be configured in a multitude of postures, some of which are described in greater detail below with regard to FIGS. 1A and 1B.

Foldable devices also include computing devices having a bendable display screen (which might be referred to herein as "bendable devices" or "bendable computing devices"), such as computing devices utilizing flexible screen technology. When such a device is not bent, it presents a single display surface. When bent, these devices present a single display surface with a crease in the middle. Bendable devices can also be configured in a multitude of postures by varying the amount of bend, some of which are also described in greater detail below with reference to FIGS. 1A and 1B.

The display screens of foldable computing devices can be touch sensitive, thereby enabling such devices to recognize touch or stylus input, presses, swipes, and other types of gestures, some of which are described below. These devices can also, of course, be used while being held in various orientations, some of which are described below with regard to FIGS. 1A and 1B.

Figure 1A:
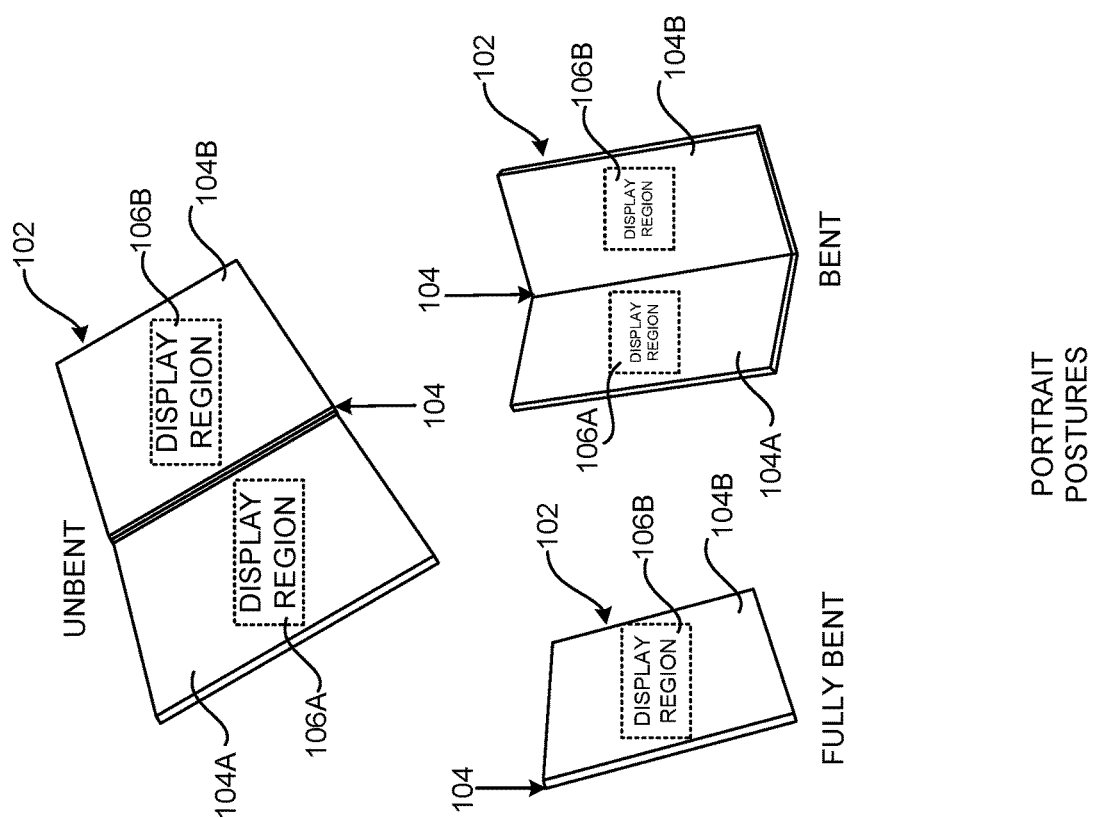

Referring now to FIGS. 1A and 1B, details regarding several postures for foldable display devices will be described. The examples shown in FIGS. 1A and 1B illustrate some possible postures for a hinged device 102. It is to be appreciated, however, that the illustrated postures generally apply to bendable devices as well.

As shown in FIG. 1A, a hinged device 102 can be configured in multiple postures by varying the angle of the hinge 104 that connects two display devices 104A and 104B (which might be referred to herein as "displays"). In FIG. 1A, for instance, the hinged device 102 is shown in a flat posture where the display screens 104A and 104B are parallel to one another in portrait orientation, a completely open posture where only a single display 104B is visible in portrait orientation, and partially open posture in portrait orientation where the hinge 104 is bent. The hinged device 102 can also be configured in a closed posture (not shown) where neither display screen is visible.

In FIG. 1B, the hinged device 102 is shown in a flat posture where the display screens 104A and 104B are in landscape orientation, in tented and propped postures where the angle of the hinge 104 enables the hinged device 102 to stand on its own and present a single display 104A, and in a partially open posture where one display 104A is flat and the other display 104B is at least partially upright, thereby forming a configuration similar to a traditional laptop computer. In this regard, it is to be appreciated that the postures illustrated in FIGS. 1A and 1B are illustrative and that other postures might also be possible.

As also shown in FIGS. 1A and 1B, the display device 104A provides a first display region 106A that encompasses all or a part of the display 104A. Similarly, the display device 104B provides a second display region 106B that encompasses all or a part of the display 104B. The first display region 106A and the second display region 106B can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. Various uses of the display regions 106A and 106B provided by the hinged device 102 will be described below.

Figure 2B:
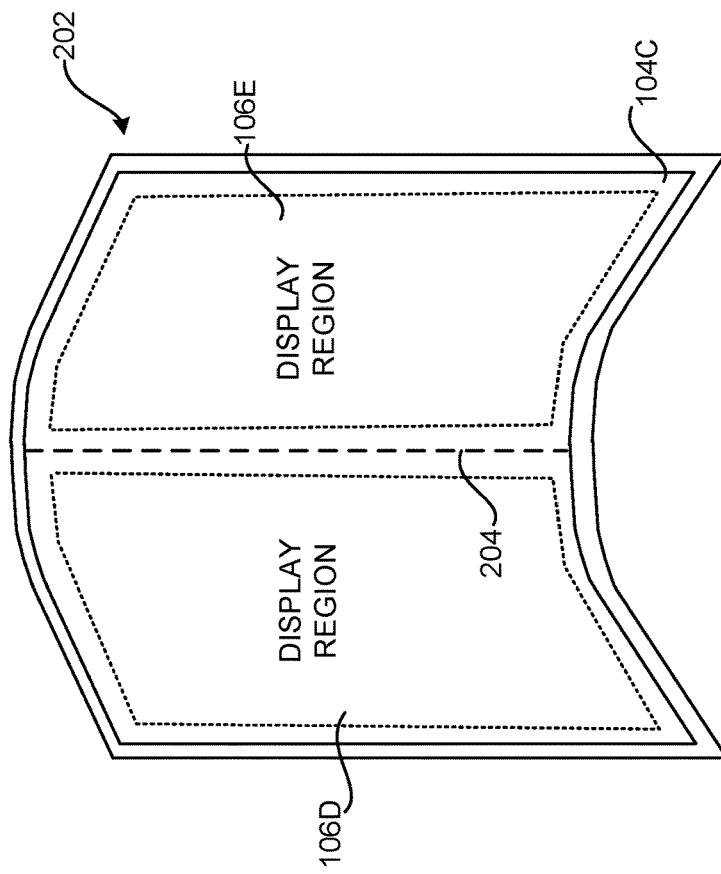
FIGS. 2A-2C are device posture diagrams illustrating aspects of the configuration and operation of a bendable computing device that implements the disclosed technologies in one particular configuration.
Figure 2A:
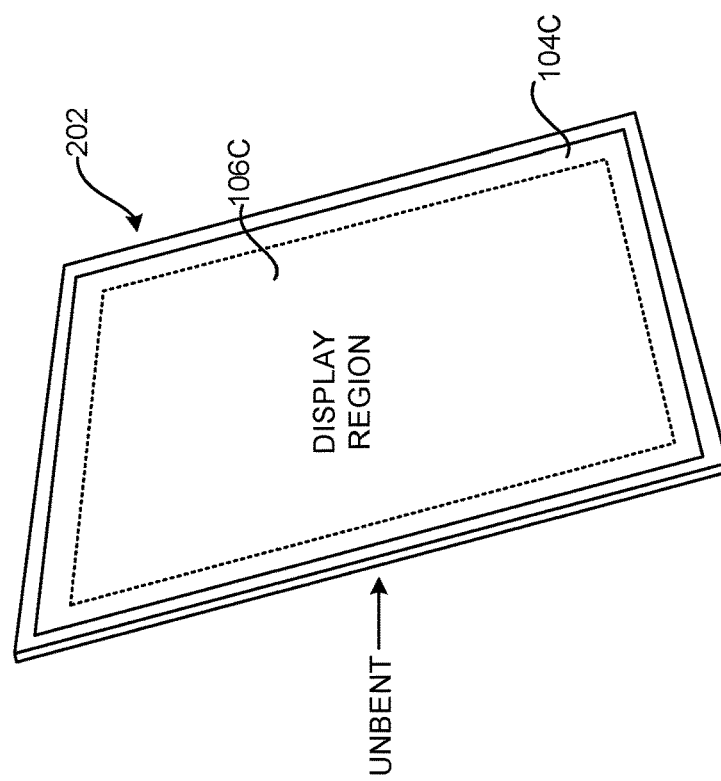

Referring now to FIGS. 2A and 2B, details will be provided regarding the configuration and operation of a bendable device 202. As mentioned above, a bendable device 202 can also be configured in postures the same as or similar to those described above with regard to FIGS. 1A and 1B. For instance, in the example posture shown in FIG. 2B, the bendable device 202 has been placed in an unbent position, thereby presenting the entirety of the bendable display device 104C (which might also be referred to herein as a "bendable screen"). The bendable device 202 can also be configured in a closed posture where neither display screen is visible.

Figure 2C:
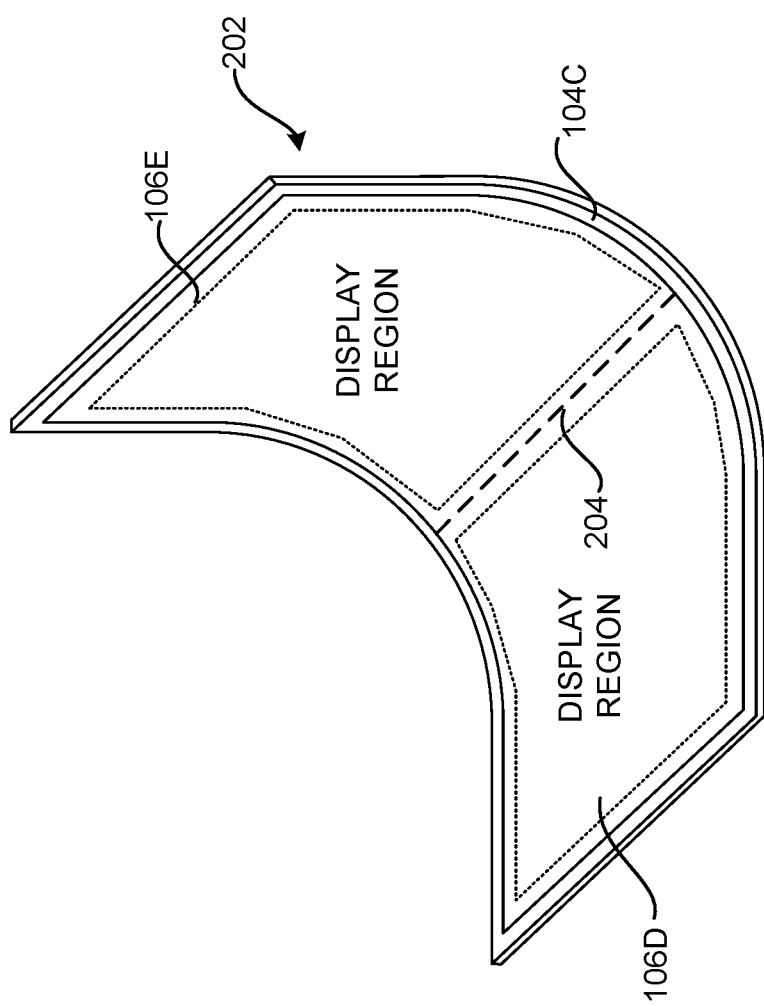

In the example posture shown in FIGS. 2B and 2C, the bendable device 202 has been partially bent similar to the partially open posture shown in FIGS. 1A and 1B. In particular, in the example shown in FIG. 2B, the bendable device 202 has been bent while the bendable screen 104C is in a landscape orientation. In the example shown in FIG. 2C, the device 202 has been bent while the bendable screen 104C is in portrait orientation. In this regard, it is to be appreciated that the configurations of the bendable device 202 shown in the FIGS. are merely illustrative and are not limiting. For example, the bendable device 202 shown in FIGS. 2A-2C has a large radius of curvature. Other bendable devices 202 can have smaller or different radii of curvature.

When the bendable device 202 is bent, a crease or "fold" 204 is formed in the bendable screen 104C. The term "fold" as used herein might refer to the area where a foldable device is folded (i.e. the area of a hinge 104 on a hinged device 102 or the area where the display of a bendable device 202 bends).

As in the case of a hinged device 102, the bendable device 202 can also provide one or more display regions. However, in the case of a bendable device 202, the number of available display regions can vary based upon the posture of the device. For instance, a single display region 106C is provided when the bendable device 202 is in an unbent posture as shown in FIG. 2A. Two display regions 106D and 106E can be provided on the bendable screen 104C when the bendable device 202 is in a bent posture, such as that shown in FIG. 2B. Various details regarding the configuration and use of the display regions 106 (which are rendered using dotted lines throughout the FIGS.) provided by foldable devices are provided below.

Providing Dynamic Screen Modes on a Bendable Computing Device

Referring now to FIGS. 3A and 3B, details will be provided regarding technologies for providing dynamic screen modes on a bendable device 202. It is to be appreciated that the bendable device 202 shown in FIGS. 3A and 3B (and FIGS. 4A-7B) has been shown two-dimensionally for ease of illustration. This is not, however, intended to indicate that the bendable device 202 is lying flat. Rather, in FIGS. 3B, 4A, 5A, 5B, 6A, 6B, the bendable device 202 is in a bent posture such as that shown in FIG. 2B.

Prior to discussing FIGS. 3A and 3B and the other FIGS., it is also to be appreciated that certain relative terms (e.g. height, width, top, bottom, left, right) might be utilized herein to describe the configuration of the displays and display regions described herein. In this regard, it is to also be appreciated that these terms have been utilized herein for ease of discussion and are not to limit the configuration of the display regions or UI elements. Other terms can be utilized to describe the displays, display regions, UI elements, and their spatial relationships to one another. It is also to be appreciated that although generally described separately, the various embodiments described briefly above and in further detail below can be utilized in combination with one another.

As discussed briefly above, foldable devices can be manipulated between a portrait orientation as shown in FIG. 3A and a landscape orientation as shown in FIG. 3B. As also discussed above, these devices can be bent to various degrees by modifying the angle of a hinge. In the case of a hinged device 102, the hinge 104 is typically visible from the front and rear of the device. In the case of a bendable device 202, the hinge is not visible from the front of the device since the bendable display 104C encompasses the entirety of the device.

In both hinged devices 102 and bendable devices 202, the hinge can be configured with a sensor capable of measure the angle of bend of the hinge (i.e. the "hinge angle") and providing data to a processor of the device that specifies the hinge angle. Additionally, or alternately, the hinge angle can be computed by using other sensor information (e.g. by comparing IMU readings from each side).

As will be described in greater detail below, the posture of foldable devices as indicated by the hinge angle can be utilized to trigger various types of UI functionality. In this regard, it is to be appreciated that whether a device is bent or unbent can be determined by comparing the current hinge angle to various threshold values. For instance, a device might be considered "bent," or in a bent posture, if the hinge angle is greater than a threshold value. The device might be considered "unbent," or in an unbend posture, if the hinge angle is less than another threshold value.

In one embodiment, a bendable device 202 is configured to dynamically transition between interaction modes that are optimized for single and multiple display regions 106 based on the hinge angle of the device 202. For example, and without limitation, a bendable device 202 might behave as if it has a single display screen and provide a single display region 106C when the device 202 is in an unbent posture. The single screen behavior might also be utilized when a device 202 is almost unbent, or barely bent. The exact angle cutoff would vary based on the hardware characteristics of the device. In this example, the display region 106C extends across the entirety of the display, including the area of the device 202 where the crease 204 would appear when bent. This interaction mode might be referred to herein as the "single display region mode."

A bendable device 202 might also behave as a dual screen device and provide multiple display regions 106D and 106E when the device 202 is in a bent posture. In the illustrated example, the display region 106D encompasses the entirety of the left side of the device 202 and the display region 106E encompasses the entirety of the right side of the device 202. This interaction mode might be referred to herein as "multiple display region mode."

If the device 202 is in an unbent posture and transitions to a bent posture, the device 202 will transition from single display region mode to multiple display region mode. Similarly, if the device 202 is in a bent posture and transitions to an unbent posture, the device 202 will transition from multiple display region mode to single display region mode in some embodiments.

As will be described in greater detail below, different types of UI functionality can be provided based upon the current posture of the device 202 as indicated by the current hinge angle. For example, a UI shell and executing applications can change aspects of their display based upon whether one or multiple display regions 106 are available.

In one embodiment, a UI shell presents a taskbar 302 across the bottom of the display screen of a bendable device 202. The taskbar 302 can provide various types of functionality including, but not limited to, launching applications, viewing icons for currently executing applications, displaying notifications, displaying UI controls for configuring aspects of the operation of a device (e.g. changing the volume level), searching, viewing available application programs, displaying the time, initiating a view of currently available windows, and others.

In the embodiment shown in FIG. 3A, the bendable device 202 displays the taskbar 302 across the entirety of the bottom edge of the display region 106C while in the single display region mode. When the device 202 transitions from single display region mode to multiple display region mode, the device 202 modifies the display of the taskbar 302 such that it encompasses only the bottom edge of one of the regions 106D and 106E. In the example shown in FIG. 3B, the taskbar 302 spans the bottom edge of the display region 106D, however, the taskbar 302 might be presented in the display region 106E in a similar manner in other embodiments. In the multiple display region mode, the taskbar 302 can be presented in either display region 106D or 106E, but not both at the same time.

When the device 202 is operating in the multiple display region mode, the UI presented by applications launched from the taskbar 302 will appear in the same display region as the taskbar 302. For instance, if the taskbar 302 is displayed in the display region 106D and utilized to launch an application, the UI provided by the launched application will be shown in the display region 106D. Similarly, if the taskbar 302 is displayed in the display region 106E and utilized to launch an application, the UI provided by the launched application will be shown in the display region 106E. This avoids duplication in the user experience and provides intuitive presentation of application UI to users.

As also illustrated in FIG. 3B, an artificial hardware seam 304 can be presented at the approximate location of the fold 204 when the device 202 is operating in multiple display region mode. In one embodiment, the artificial hardware seam 304 is a solid vertical bar displayed on the display screen of the device 202 between the display regions 106D and 106E.

Various visual attributes of the artificial hardware seam 304 can be varied based upon the specific hardware of the device 202 including, but not limited to, the radius of curvature of the hinge in the device 202. Presentation of the artificial hardware seam 304 reinforces the appearance of the single physical display of the device 202 as being subdivided into discrete display regions 106D and 106E.

Even though the artificial hardware seam 304 acts as a divider between the display regions 106D and 106E, touch input is still available in the area of the artificial hardware seam 304. As a result, touch gestures originating or ending at the artificial hardware seam 204 can initiate various types of functionality. Some of the gestures are described below.

Turning now to FIGS. 4A and 4B, details will be provided regarding functionality provided by a gesture 404 that originates outside the area of the artificial hardware seam 304 and ends within the area of the artificial hardware seam 304. In this example, a touch gesture 404 (in this case made with a user's finger) originates inside a window presented by an application executing on the computing device 202. The gesture 404 ends within the area of the artificial hardware seam 304.

The gesture 404 shown in FIG. 4A causes the application or operating system to modify the application window 402 such that it spans the display regions 106D and 106E. The artificial hardware seam 304 might remain on screen or might be removed as in the example shown in FIG. 4B when an application window 402 spans multiple display regions 106. Additionally, in some embodiments, application windows 402 that span multiple display regions 106 (as shown in FIG. 4B) automatically transition to a windowed (as shown in FIG. 4A) or maximized state (i.e. filling the entirety of a display region 106) in one of the regions 106 when the device 202 transitions from an unbent posture to a bent posture.

In some embodiments, the behavior illustrated in FIGS. 4A and 4B described above is utilized when the application presenting the application window 402 is a legacy application (which might be referred to as a "non-multiple display region—enabled application") that has not been programmed to utilize the display regions 106D and 106E independently without overlapping the fold 204. Different types of functionality can be provided, however, by applications that have been configured to utilize multiple display regions 106 independently (which might be referred to herein as "multiple display region-enabled applications"). FIGS. 5A and 5B illustrate one type of behavior that can be provided by such an application.

In the example shown in FIG. 5A, the device 202 is configured in an unbent posture and an application has presented an application window 502A (which might alternately be maximized) in the display region 106D that spans across both sides of the display. The artificial hardware seam 304 is not displayed in this configuration.

When the device 202 transitions to a bent posture as illustrated in FIG. 5B, the application modifies its display to provide two application windows 502B and 502C (which might be maximized to encompass the entirety of the display regions 106D and 106E, respectively). The artificial hardware seam 304 is also displayed when the device 202 transitions to the bent posture shown in FIG. 5B. In this manner, application windows 402 can be resized appropriately depending upon whether the device 202 is operating in the single display region mode or the multiple display region mode.

As discussed briefly above, each of the application windows 502B and 502C can provide different types of functionality. For instance, the application window 502B might present a list of email messages while the application window 502C displays the contents of a selected email message. The application windows 502 can be maximized in some embodiments (e.g. first maximized on one half and then spanned across the entire display region).

Figure 6B:
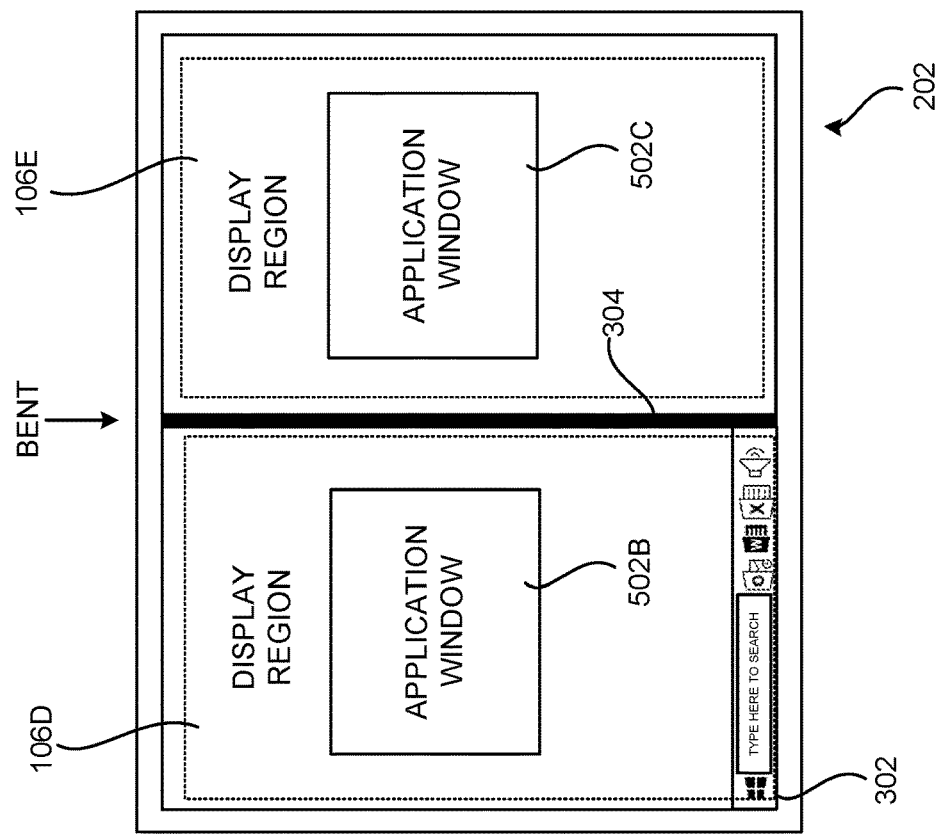
FIGS. 6A and 6B are device user interface diagrams illustrating aspects of a gesture that originates inside the area of an artificial hardware seam and ends outside the area of the artificial hardware seam, according to one embodiment.
Figure 6A:
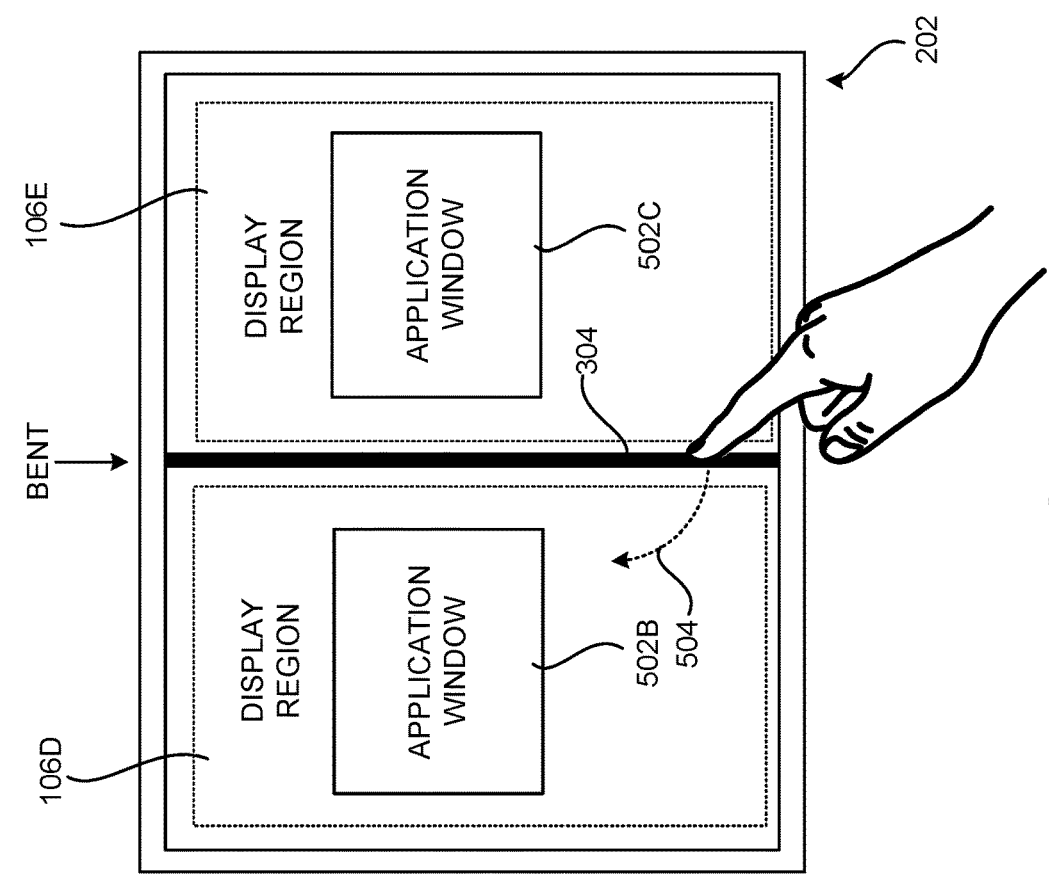

Turning now to FIGS. 6A and 6B, details will be provided regarding functionality provided by a gesture 504 that originates inside the area of the artificial hardware seam 304 and ends outside the area of the artificial hardware seam 304. As shown in FIG. 6A, the taskbar 302 is not displayed in this example. The taskbar 302 is presented in response to the gesture 504 as illustrated in FIG. 6B. In this regard, it is to be appreciated that gestures originating inside the area of the artificial hardware seam 304 and ending outside the area of the artificial hardware seam 304 can be utilized to invoke other types of functionality including, but not limited to, a UI for showing available windows, a UI for showing notifications, and others.

Figure 7B:
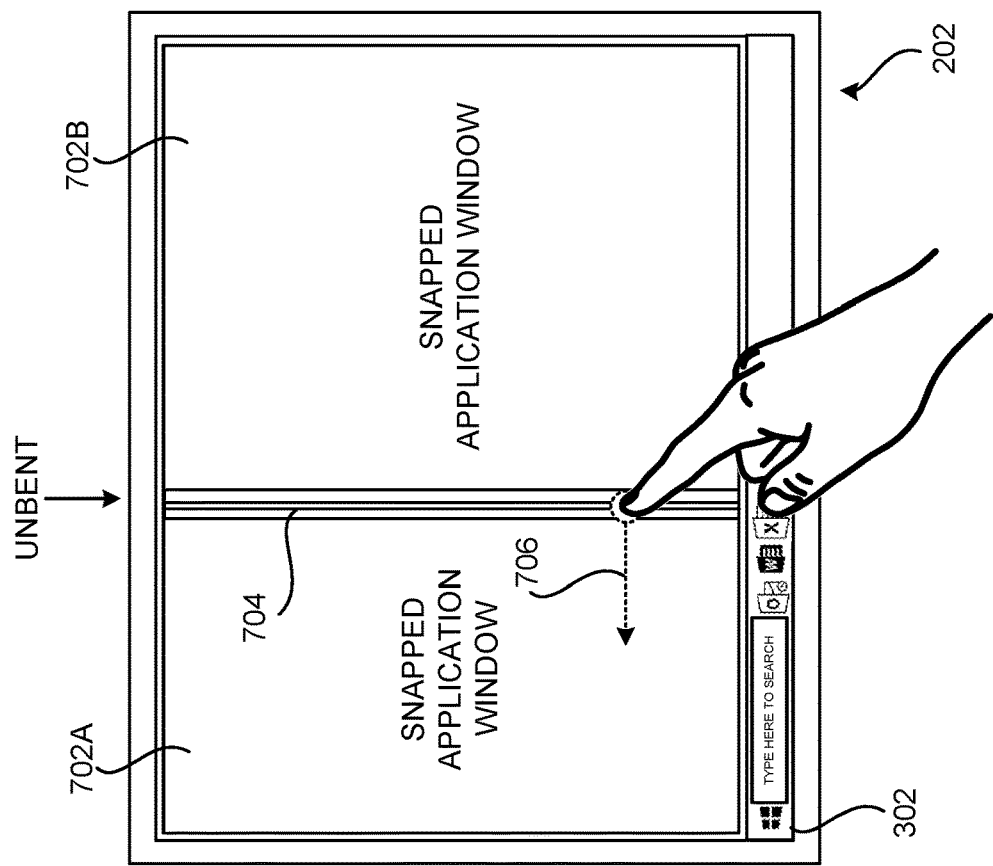
FIGS. 7A and 7B are device user interface diagrams illustrating aspects of a mechanism whereby an artificial hardware seam is replaced with a user-adjustable window divider when a device is flattened, according to one embodiment.
Figure 7A:
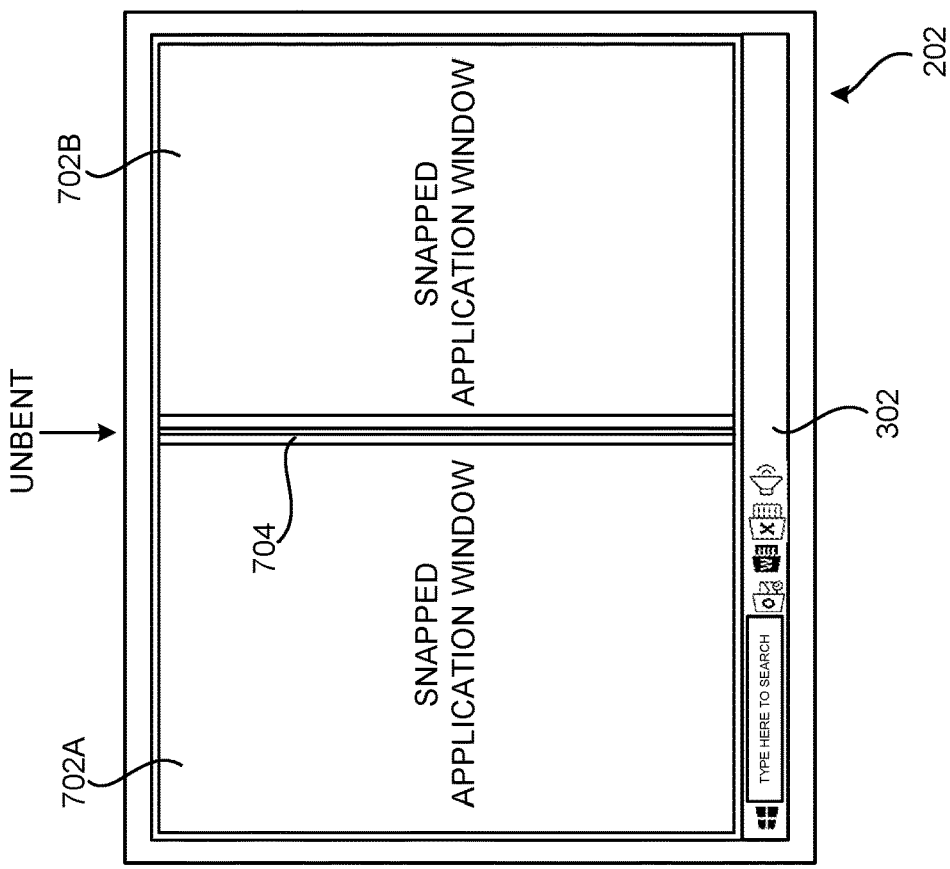

Turning now to FIGS. 7A and 7B, an embodiment will be described wherein the artificial hardware seam 304 is replaced with a user-adjustable window divider when the device is flattened (i.e. transitioned from a bent posture to an unbent posture) while snapped or maximized application windows are displayed. In this embodiment, application windows can be "snapped" or maximized whereby they fill the entirety of a display region. In the example shown in FIG. 7A, for instance, the application windows 702A and 702B have been snapped in their respective display regions.

In the example shown in FIG. 7A, a divider 704 has also been displayed at a location in the area of the fold 204 and at which the application windows 702A and 702B meet. In the illustrated example, the divider 704 is presented as vertical lines. Other types of UI elements with other types of attributes can be utilized in other embodiments.

The divider 704 is fixed in some embodiments. In other embodiments, such as that illustrated in FIG. 7B, the divider 704 is movable. When the divider 704 is moved, the respective sizes of the snapped application windows 702A and 702B are modified. In the example shown in FIG. 7B, for instance, a user has initiated a gesture 706 in the area of the divider 704 and dragged left. Responsive to this gesture, the divider 704 moves to the left and, accordingly, the snapped application window 702A is made smaller and the snapped application window 702B is made larger.

Figure 8:
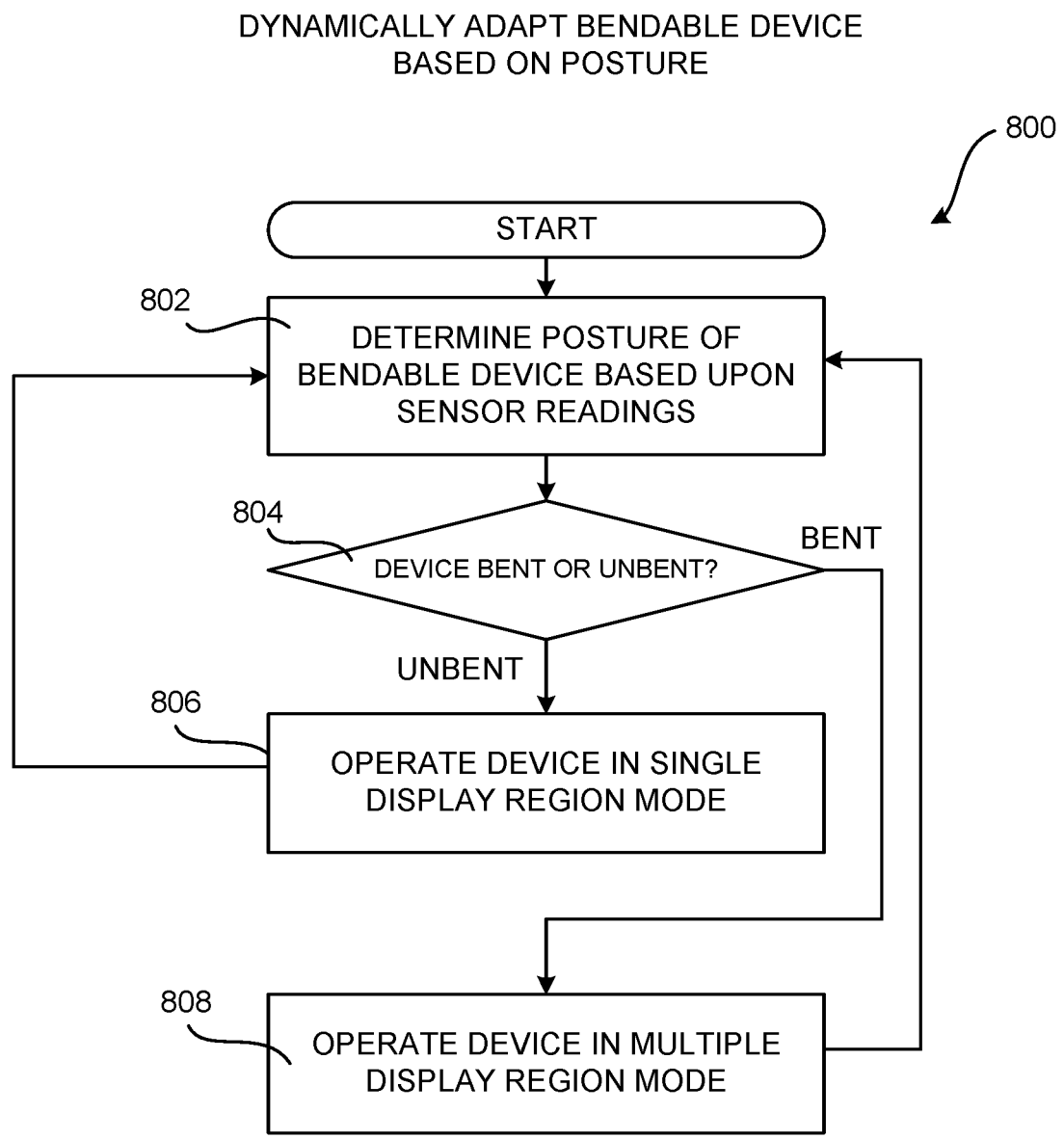
FIG. 8 is a flow diagram showing a routine that illustrates aspects of the operation of a bendable computing device for providing dynamic screen modes based upon a posture of the device, according to one embodiment.

FIG. 8 is a flow diagram showing a routine 800 that illustrates aspects of the operation of a bendable computing device for providing interaction modes that are optimized for single and multiple display regions 106 based on a hinge angle of the device, according to one embodiment disclosed herein. It should be appreciated that the logical operations described herein with regard to FIG. 8, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein. For instance, the optimizations and transitions described herein with regard to FIGS. 8 and 15, and the other FIGS. can be performed independently of one another depending upon various conditions, at least some of which have been described herein.

The routine 800 begins at operation 802, where a bendable device 202 determines its posture by calculating the hinge angle from one or more sensors, such as a hinge angle sensor. The routine 800 then proceeds to operation 802, where the bendable device 202 determines whether it is in a bent posture or an unbent posture. If the bendable device 202 is unbent, the routine 800 proceeds to operation 806, where the bendable device 202 operates in the single display region mode as described above. The routine 800 then returns back to operation 802, where another determination can be made regarding the current posture of the device 202.

If, at operation 804, the bendable device 202 determines that it is currently in a bent posture, the routine 800 proceeds to operation 808, where the device 202 operates in the multiple display region mode as described in detail above. The routine 800 then returns back to operation 802, where another determination can be made regarding the current posture of the device 202.

UI Transitions and Optimizations for Foldable Computing Devices

As described briefly above, the disclosed technologies also encompass transitions and optimizations for foldable computing devices. These transitions and optimizations generally can be utilized with foldable devices that are configured in postures other than a posture resembling a traditional laptop computer (i.e. a foldable device that is bent with two display regions in landscape orientation). These transitions and optimizations might also be utilized in other device postures. Details regarding several illustrative transitions and optimizations are provided below.

Figure 9B:
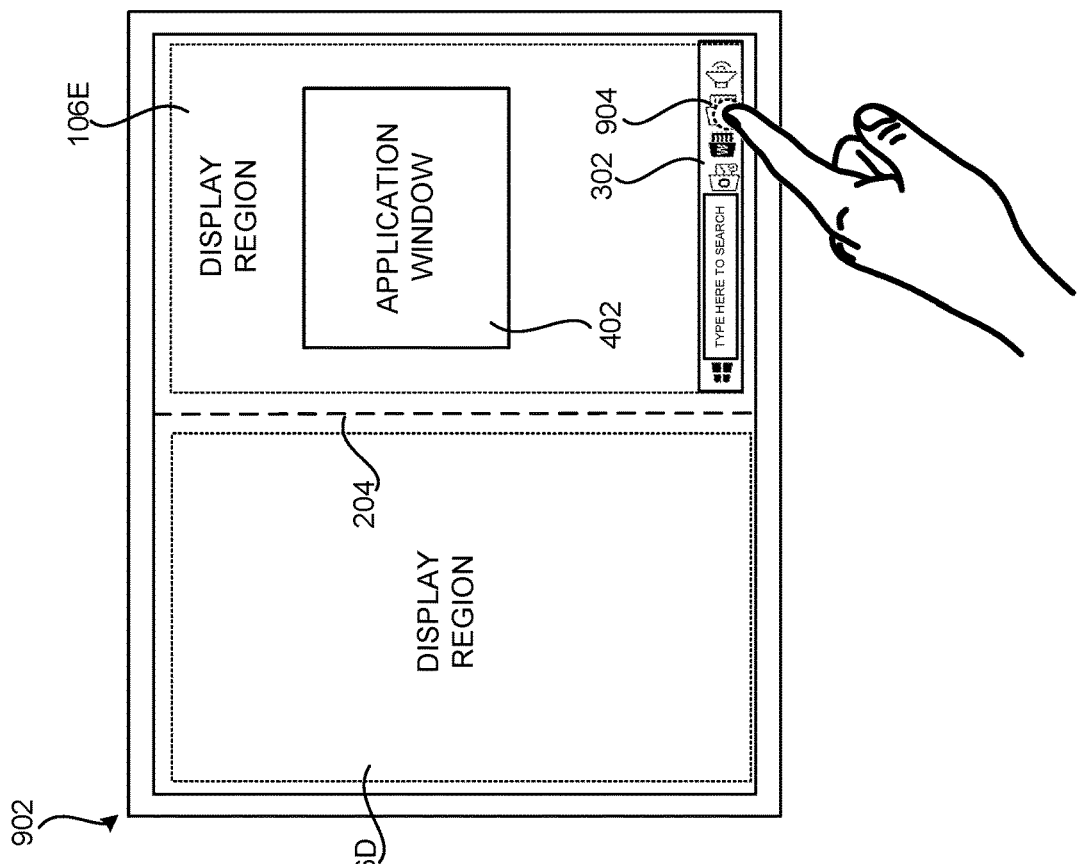
FIGS. 9A and 9B are device user interface diagrams illustrating aspects of a UI optimization disclosed herein that enables an application window to be presented in a predictable location when an application is launched on a foldable computing device, according to one embodiment.
Figure 9A:
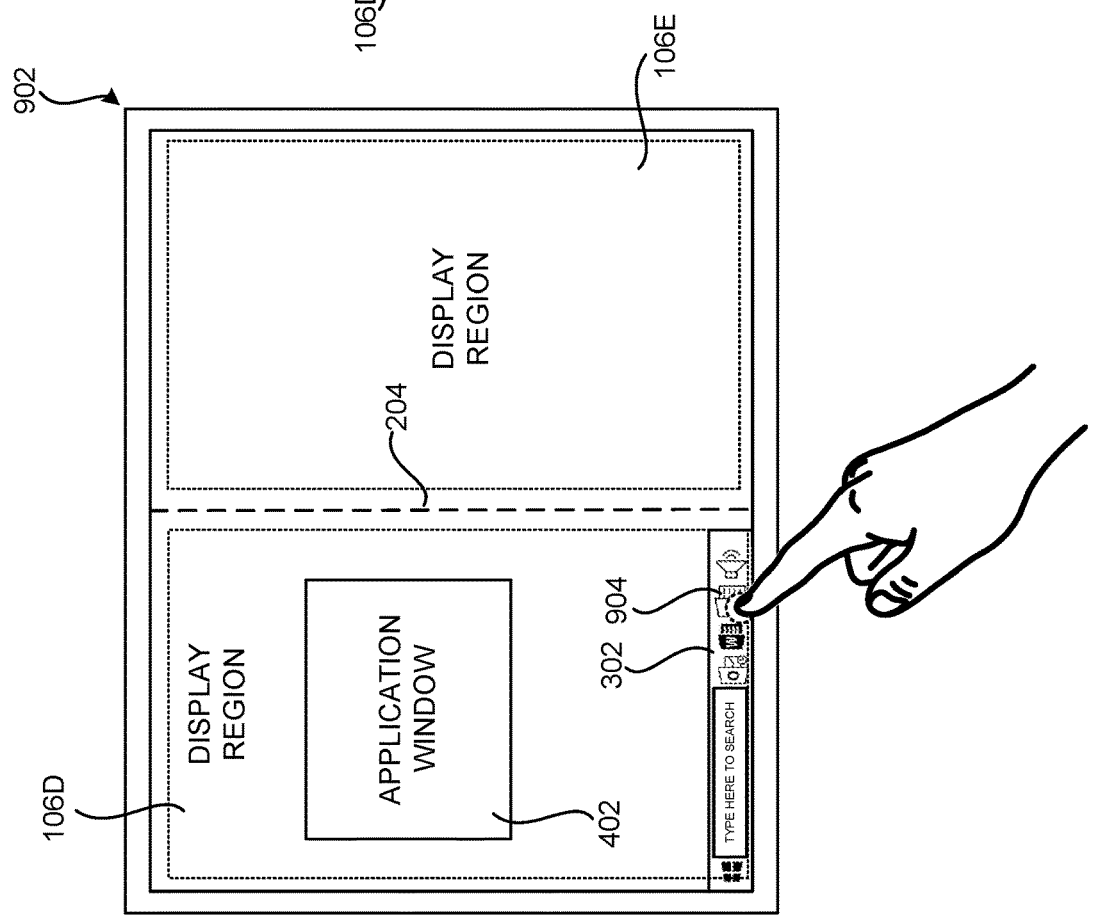

Turning now to FIGS. 9A and 9B, a UI optimization for foldable computing devices will be described that enables an application window to be presented in a predictable location when an application is launched on a foldable computing device. In the example shown in FIG. 9A, a foldable computing device 902 (i.e. a hinged computing device 102 or a bendable computing device 202) is configured in a posture by which two display regions 106D and 106E are presented. A taskbar 302 is also presented at the bottom of the display region 106D. As discussed above, the taskbar 302 provides functionality for launching (i.e. starting execution) of applications among other types of functionality. In this regard, it is to be appreciated that while the examples described herein are presented in the context of launching applications from a taskbar, similar functionality can be provided when applications are launched from other types of operating system ("OS")-provided application launching surfaces (e.g. the start menu provided by the WINDOWS operating system).

In the example shown in FIG. 9A, a user has selected an icon 904 in the taskbar 302 in order to launch an associated application. In response thereto, the foldable device 902 has launched the application in the display region 106D containing the taskbar 302. Consequently, the application window 402 generated by the application is presented in the display region 106D rather than the display region 106E.

In the example shown in FIG. 9B, the taskbar 302 is presented at the bottom of the display region 106E. As in the example above, a user has selected an icon 904 in the taskbar 302 in order to launch the associated application. In response thereto, the foldable device 902 has launched the application in the display region 106E containing the taskbar 302. Consequently, the application window 402 generated by the application is presented in the display region 106E rather than the display region 106D. By launching applications in the currently active display area (i.e. the display area 106 in which the taskbar 302 is currently displayed), users can easily predict where the UI generated by launched applications will appear.

Figure 10B:
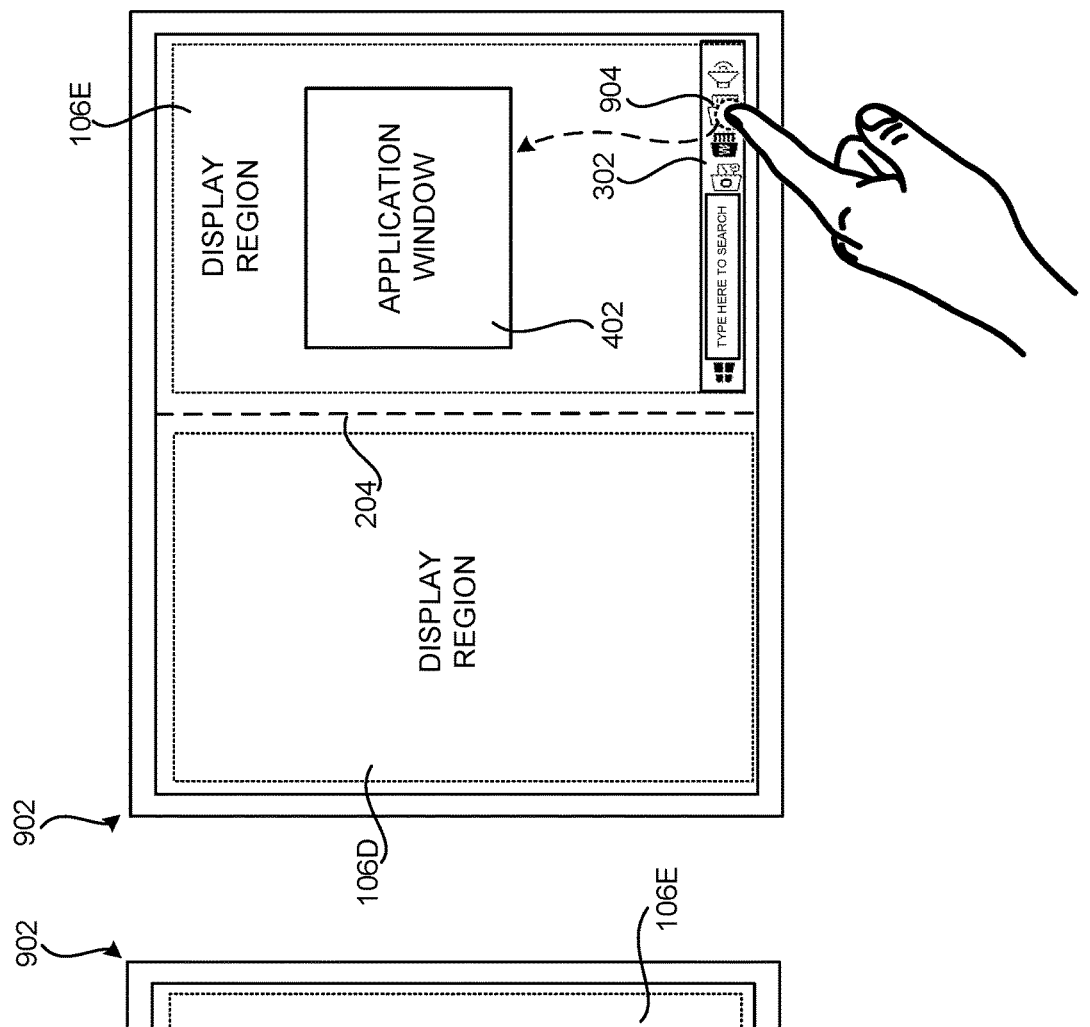
FIGS. 10A and 10B are device user interface diagrams illustrating aspects of a UI optimization disclosed herein that enables an application window to be moved to an active display area on a foldable computing device, according to one embodiment.
Figure 10A:
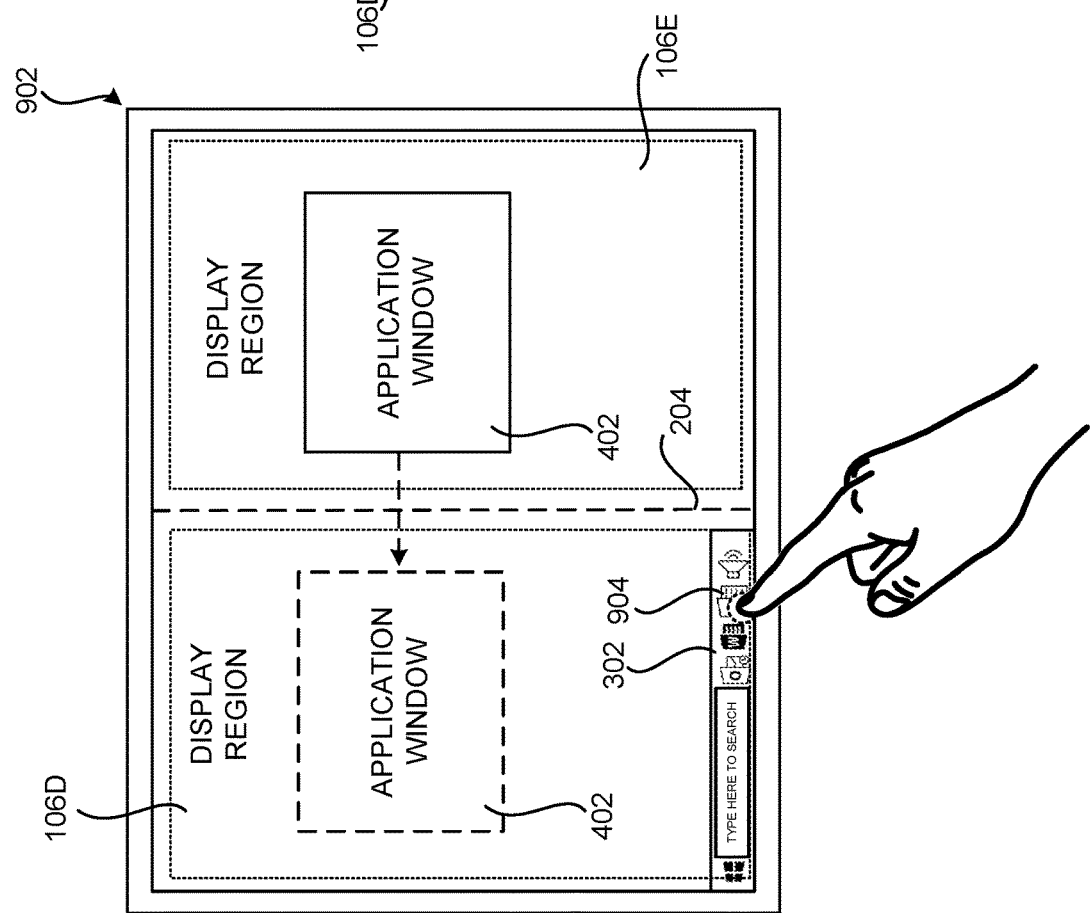

Referring now to FIGS. 10A and 10B, a UI optimization will be described that enables an application window to be moved to an active display area on a foldable computing device. In the example shown in FIG. 10A, for instance, an application is currently executing in the foreground on the foldable computing device 902 and displaying the application window 402 in the display region 106E. In this embodiment, a user can cause the application window 402 to move to the active display region 106D (i.e. the display region 106 containing the taskbar 302) by selecting the icon 904 associated with the application in the taskbar 302.

In the example shown in FIG. 10B, the application window 402 has been minimized or the application is running in the background. Accordingly, the application window 402 is not visible within either display region 106D or 106E. In this embodiment, a user can cause the application window 402 to be displayed in the active display region 106E (i.e. the display region 106 containing the taskbar 302) by selecting the icon 904 associated with the application in the taskbar 302.

It is to be appreciated that while an icon 904 is utilized in the embodiments shown in FIGS. 10A and 10B to move or display an application window 402, other UI elements can be selected in order to perform the same functionality in other embodiments. For example, and without limitation, a launcher UI control that provides functionality for launching applications (e.g. the start menu in the WINDOWS 10 operating system), a task view UI that shows windows corresponding to applications currently running, or a UI control for presenting notifications from applications. In general, any display region-specific UI control that summons or causes an application already running to appear can be utilized to provide the functionality described above.

Referring now to FIGS. 11A and 11B, a UI optimization will be described that enables a modal UI element to be presented in such a way that it does not overlap or intersect the seam 204 on a foldable computing device 902. As shown in FIG. 11A, an application might cause modal UI element (in this case a modal dialog box 1102) to be presented. A modal UI element is a UI element that requires user interaction before the user can interact with the underlying UI (e.g. the application window 402 in the illustrated embodiments).

In order to avoid presentation of a modal UI element that overlaps the seam 204, the foldable computing device 902 determines if a modal UI element is or is to be displayed at a location that overlaps the seam 204. If such a modal UI element is identified, the foldable device 902 moves the modal UI element to a location within a display region 106 such that the modal UI element will not overlap the seam 204.

In the example shown in FIGS. 11A and 11B, for instance, the modal dialog box 1102 has been moved to the display region 106E so that it no longer overlaps the seam 204. According to various embodiments, the device 902 may consider various factors in deciding to which display region 106 the modal UI element should be moved. Examples include, but are not limited to, the percentage of the element's display area that overlaps each display region 106, the degree of overlap that would be caused after moving to one vs. the other display region 106, or the affinity in the element's content to other content already displayed in one vs. the other display region 106 (e.g. a modal UI element might be displayed in a display region that already displays windows associated with the application presenting the modal UI element).

Figure 12B:
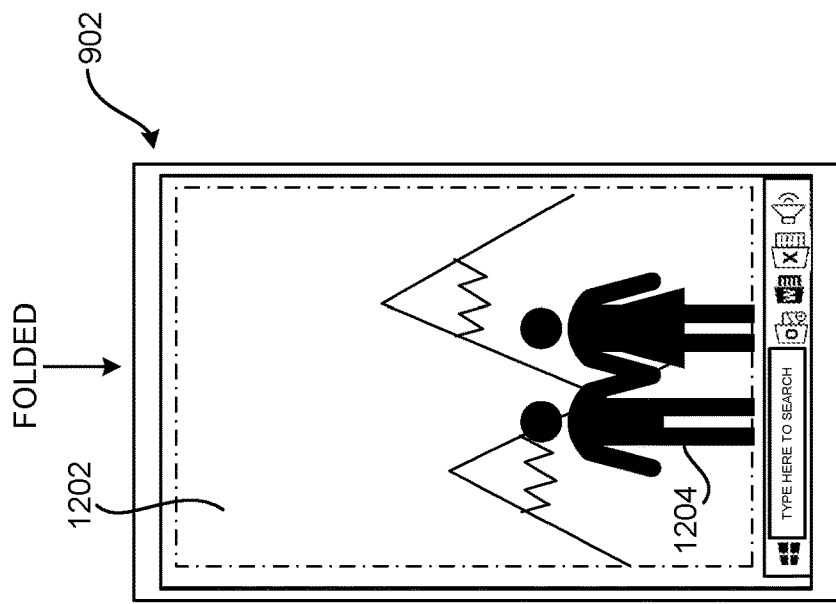
FIGS. 12A and 12B, are device user interface diagrams illustrating aspects of a UI optimization disclosed herein that enables an image presented by a foldable computing device to be adjusted to maintain a view of the focal point of the image across device posture and orientation changes, according to one embodiment.
Figure 12A:
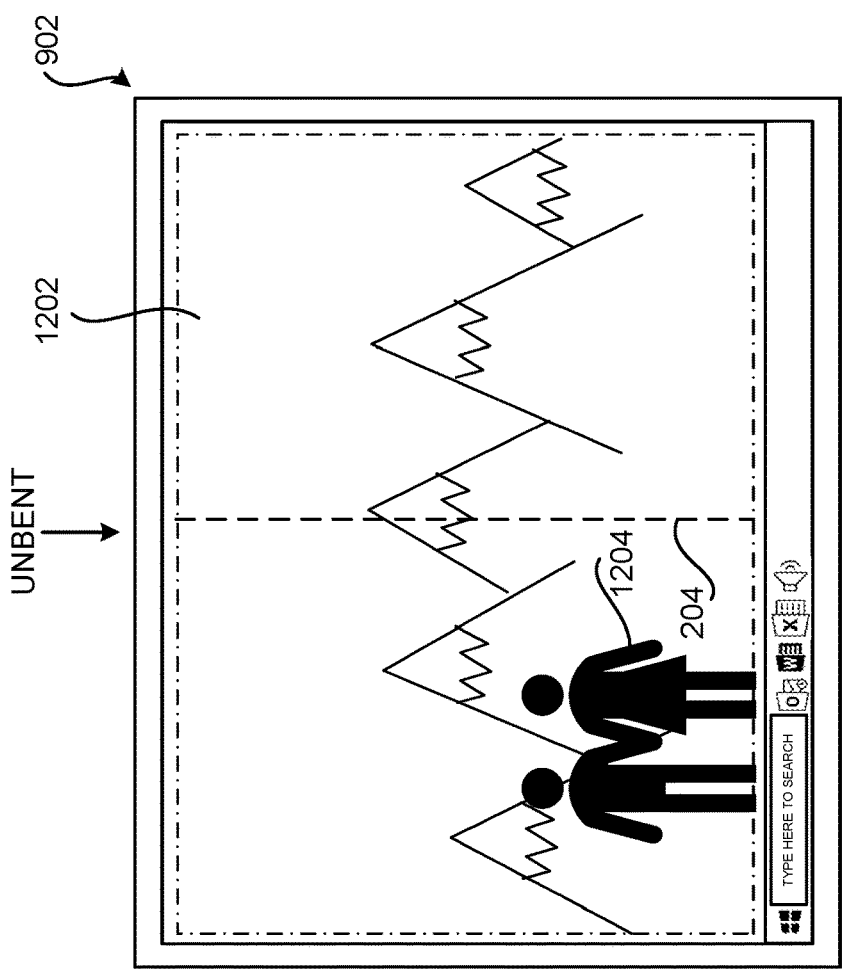

Referring now to FIGS. 12A and 12B, a UI optimization will be described that enables properties of an image 1202 presented by a foldable computing device 902 to be adjusted to maintain a view of the focal point of the image 1202 across device posture and orientation changes. In this embodiment, a foldable computing device 902 can move, resize, or otherwise modify an image 1202 to maintain a view of the focal point of the image 1202.

In the example shown in FIG. 12A, a background image 1202 has been displayed on a foldable computing device 902 that is in an unbent posture in a landscape orientation. The illustrative image 1202 shows two people in front of a mountain background. In this example, the focal point 1204 of the image is the two people. As used herein, the term "focal point" means the portion of an image 1202 that contains the most important or interesting feature of the image 1202. The focal point of an image 1202 can be identified in various ways such as, but not limited to, machine learning. In other embodiments, a user can specify the focal point of an image 1202.

In the example shown in FIGS. 12A and 12B, a user has transitioned the foldable device 902 to a folded posture where only a single display region is viewable. In response to this transition between postures, the foldable device 902 has identified the focal point 1204 in the image 1202 and moved, resized, or otherwise modified the image 1202 in order to maintain the user's view of the focal point 1204 of the image. Other types of changes to an image 1202 might also be performed in order to maintain a view of the focal point 1202 of the image 1202. Additionally, these aspects can be applied to other types of images other than background images.

Figure 13B:
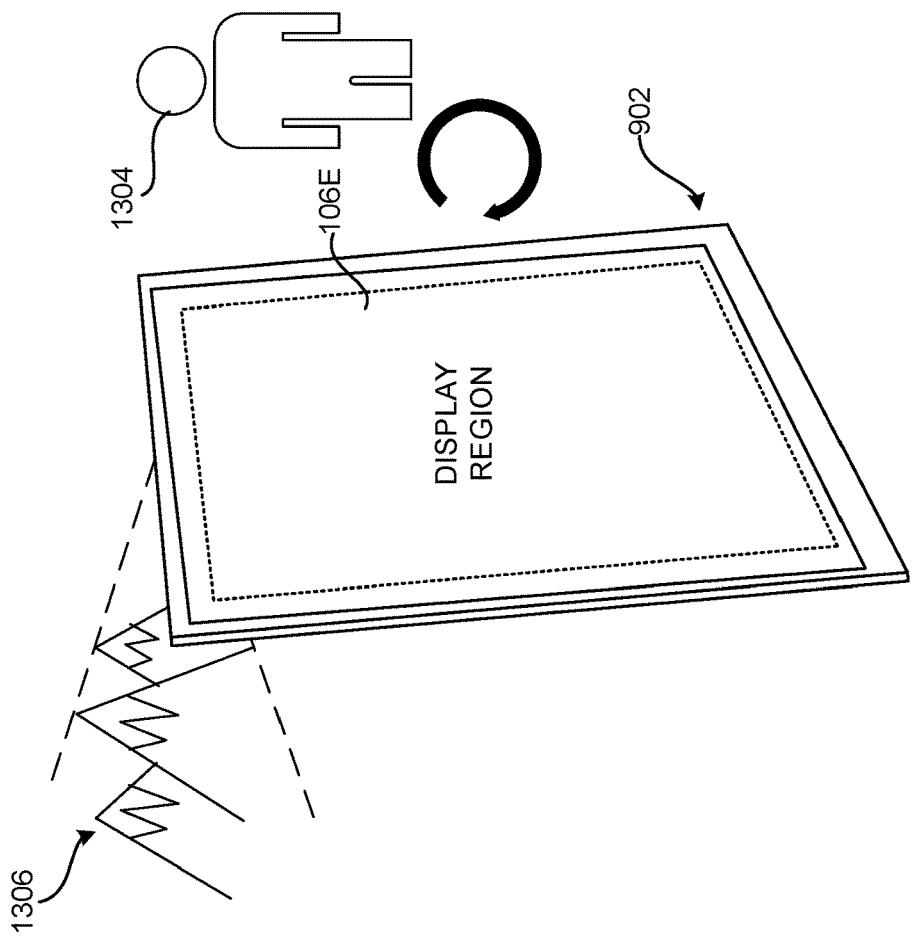
FIGS. 13A and 13B are device user interface diagrams illustrating aspects of a UI optimization that enables a foldable device having a single camera to transition between UI modes optimized for front-facing and world-facing image capture, according to one embodiment disclosed herein.
Figure 13A:
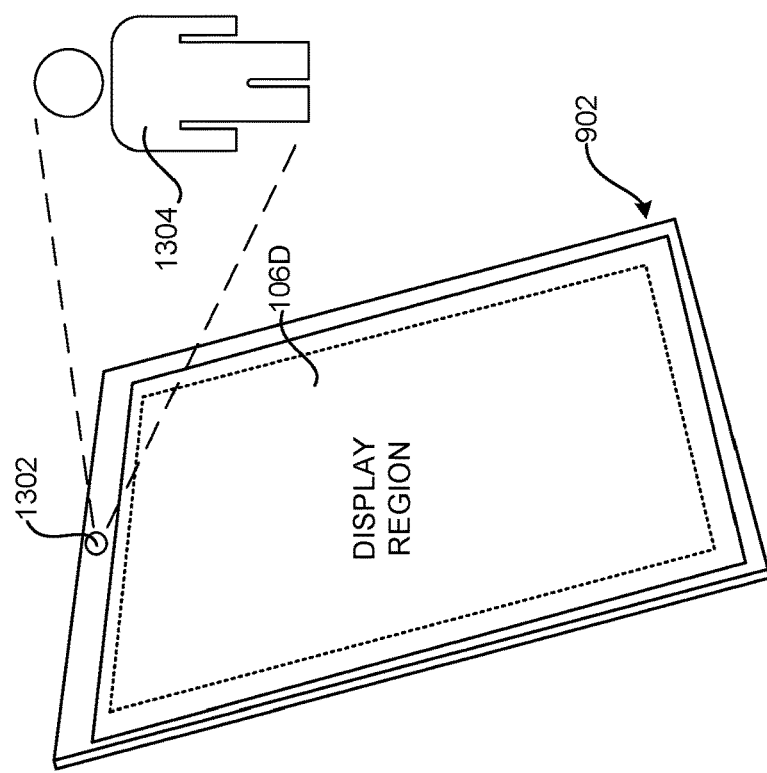

Referring now to FIGS. 13A and 13B, a UI optimization will be described that enables a foldable device 902 having a single camera 1302 to transition between UI modes optimized for front-facing and world-facing still or moving image capture. In the example shown in FIG. 13A, a user 1302 has configured a foldable device 902 to a folded posture where only a single display region 106D is viewable. Additionally, the side of the foldable device 902 configured with a camera 1302 is facing the user 1302. In this way, the foldable device 902 is capable of taking a front-facing image (e.g. a "selfie") of the user 1304.

When the foldable device 902 is positioned in the manner shown in FIG. 13A, a UI for taking a still image or video is presented to the user 1304 in the display region 1304. When the foldable device 902 is rotated 180 degrees (which might be referred to herein as a "flip"), however, the foldable device 902 provides the UI for performing image or video capture in the display region 106E on the other side of the device.

In the example shown in FIGS. 13A and 13B, for example, the user 1304 has flipped the device 902 in the manner described above in order to take an image or video of a real-world scene 1306 that includes mountains. In this example, the UI for taking an image is presented in the display region 106E. Other types of UIs can also or alternately be shown to the user 1304 in the display regions 106D or 106E in response to detecting that the device 902 has been flipped. Additionally, these transitions between UI modes can be provided when the device is flipped while in any of the device postures described above. The device can be manipulated in other ways to change its posture, such as by folding one side behind the other.

It is to be appreciated that various sensors and software functionality can be utilized to detect the posture and orientation of a device 902, how a user 1304 is holding a device 902, and whether a device 902 has been flipped or re-oriented in other ways. For example, and without limitation, an inertial measurement unit ("IMU"), capacitive signals from display screens (e.g. fingertips detected on a display region facing away from a user), cameras, proximity sensors, and ambient light sensors might be utilized in this manner.

In some configurations, applications executing on a foldable device 902 can register with an operating system to utilize various types of functionality. In order for these applications to function properly on a foldable device 902 having a single camera, the operating system can report that the device 902 is configured with two virtual cameras (i.e. a front-facing camera and a world-facing camera) even though in actuality it only has one physical camera 1302.

When an application requests the use of a particular camera, the operating system can configure the device in an appropriate state for use of the requested camera. For instance, if the application requests the use of a front-facing camera, the device 902 can present a UI for taking an image or video in the display region 106D (i.e. the display region 106D on the same side of the device as the camera 1302). If the application requests the use of a world-facing camera, the device 902 can present a UI for taking an image or video in the region 106E (i.e. the display region 106D on the opposite side of the device as the camera 1302).

Figure 14B:
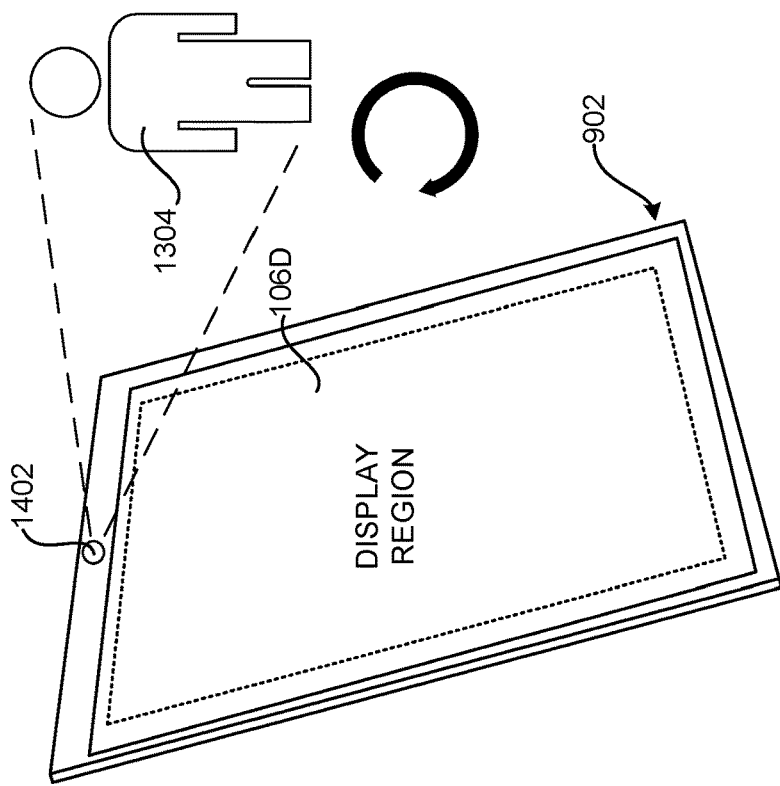
FIGS. 14A and 14B are device user interface diagrams illustrating aspects of UI optimization that enables a foldable device equipped with a biometric sensor on one side of the device to provide a UI for instructing a user to flip the device when the biometric sensor is in use, according to one embodiment.
Figure 14A:
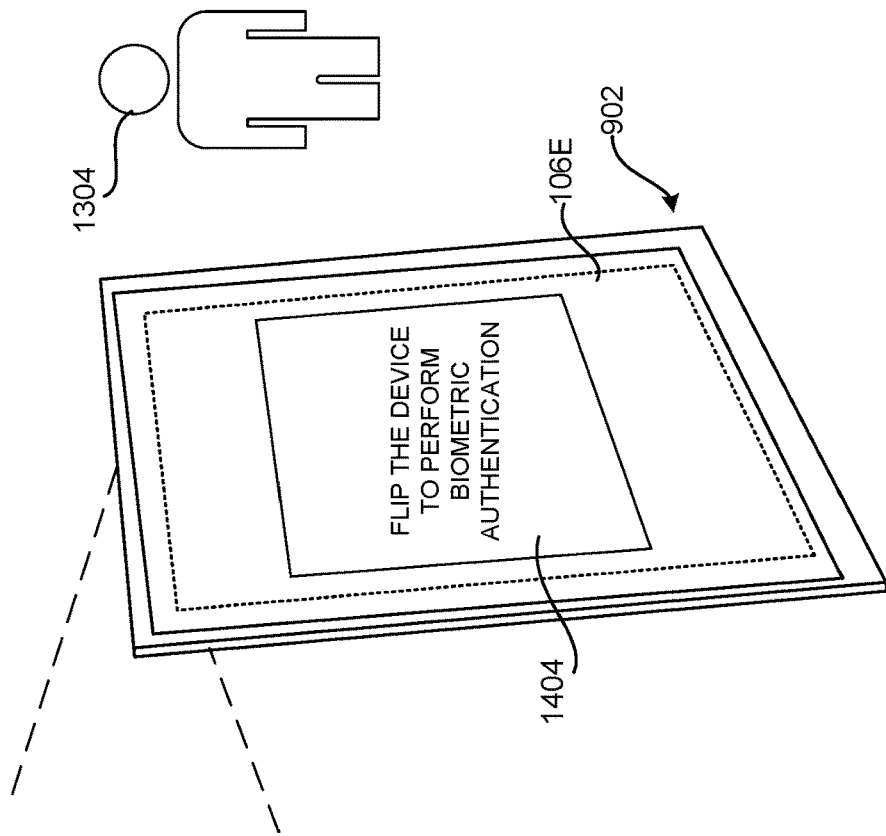

Referring now to FIGS. 14A and 14B, a UI optimization will be described that enables a foldable device 902 equipped with a biometric sensor 1402 on one side of the device 902 to provide a UI for instructing a user to flip the device when the biometric sensor 1402 is in use. In this example, the foldable device 902 stores information indicating the correct posture and orientation for the device 902 to be able to authenticate a user 1304 using biometric authentication. Biometric authentication can be performed using still or video cameras, depth of field cameras, or other types of sensors 1402.

In the example shown in FIG. 14A, a user 1304 is attempting to perform biometric authentication with the device 902. In this example, however, the device 902 is in a posture and orientation that results in the biometric sensor 1402 facing away from the user 1304. As discussed above, the device 902 can detect that it is in a posture and orientation that will not enable biometric authentication of the user 1402. Consequently, the device 902 presents a UI window 1401 in the display region 160E instruction the user 1304 to flip the device 902 to perform biometric authentication.

Other types of UIs might also or alternately be provided in order to indicate that the user needs to flip the device 902 in order to authenticate. For example, and without limitation, the display region 106E might be cleared, content might be animated in the display area 106E such as an arrow pointing to the edge of the device, or another type of UI encouraging the user 1304 to flip the device 902 to the other side. Once the user 1304 flips the device 902, as shown in FIG. 14B, biometric authentication can be performed.

In some embodiments, a foldable device 902 is configured to adjust its windowing and other UI functionality for applications based upon their detected support for certain windowing behaviors. For example, and without limitation, a foldable device 902 can detect whether an application implements windowing behaviors that are inconsistent or incompatible with the multiple display region mode described above. For example, certain applications might not permit their windows to be minimized, maximized, or resized. For these types of applications, the device 902 can provide a visual container or special layer where application windows are quarantined.

Figure 15:
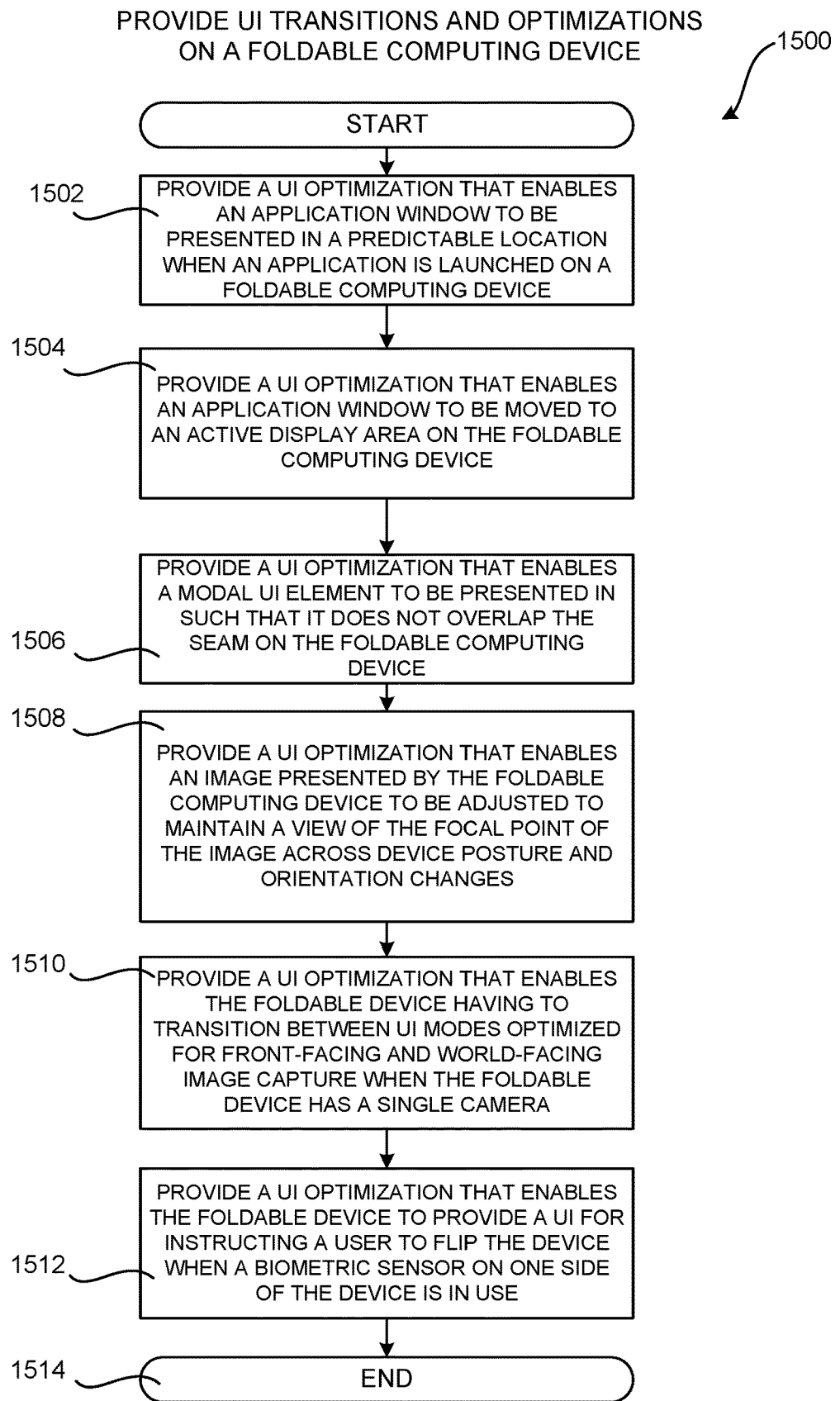
FIG. 15 is a flow diagram showing a routine that illustrates aspects of the operation of a foldable computing device for providing transitions and optimizations in a UI, according to one embodiment disclosed herein.

FIG. 15 is a flow diagram showing a routine 1500 that illustrates aspects of the operation of a foldable computing device 902 for providing transitions and optimizations in a UI. As mentioned above, the optimizations and transitions described herein with regard to FIG. 15 can be performed independently of one another depending upon various conditions, at least some of which have been described herein. Therefore, although the operations shown in FIG. 15 have been shown as being performed linearly for ease of illustration, each of the described optimizations and transitions can be performed separately from the others.

The routine 1500 begins at operation 1502, where a foldable device 902 provides a UI optimization that enables an application window to be presented in a predictable location when an application is launched on the foldable device 902 in the manner described above. The routine 1500 then proceeds for operation 1504, where the foldable computing device 902 provides a UI optimization that enables an application window to be moved to an active display area on the foldable computing device 902 in the manner described above.

From operation 1504, the routine 1500 proceeds to operation 1506, where the computing device provides a UI optimization that enables a modal UI element to be presented in such a way that it does not overlap the seam on the foldable computing device, in the manner described above. The routine 1500 then proceeds to operation 1508, where the foldable computing device 902 provides a UI optimization that enables an image presented by the foldable computing device to be adjusted to maintain a view of the focal point of the image across device posture and orientation changes, in the manner described above.

From operation 1508, the routine 1500 proceeds to operation 1510, where the foldable computing device 902 provides a UI optimization that enables the foldable device having to transition between UI modes optimized for front-facing and world-facing image capture when the foldable device has a single camera, in the manner described above. The routine 1500 then proceeds to operation 1512, where the foldable computing device 902 provides a UI optimization that enables the foldable device to provide a UI for instructing a user to flip the device when a biometric sensor on one side of the device is in use, in the manner described above. The routine 1500 then proceeds to operation 1514, where it ends.

Figure 16:
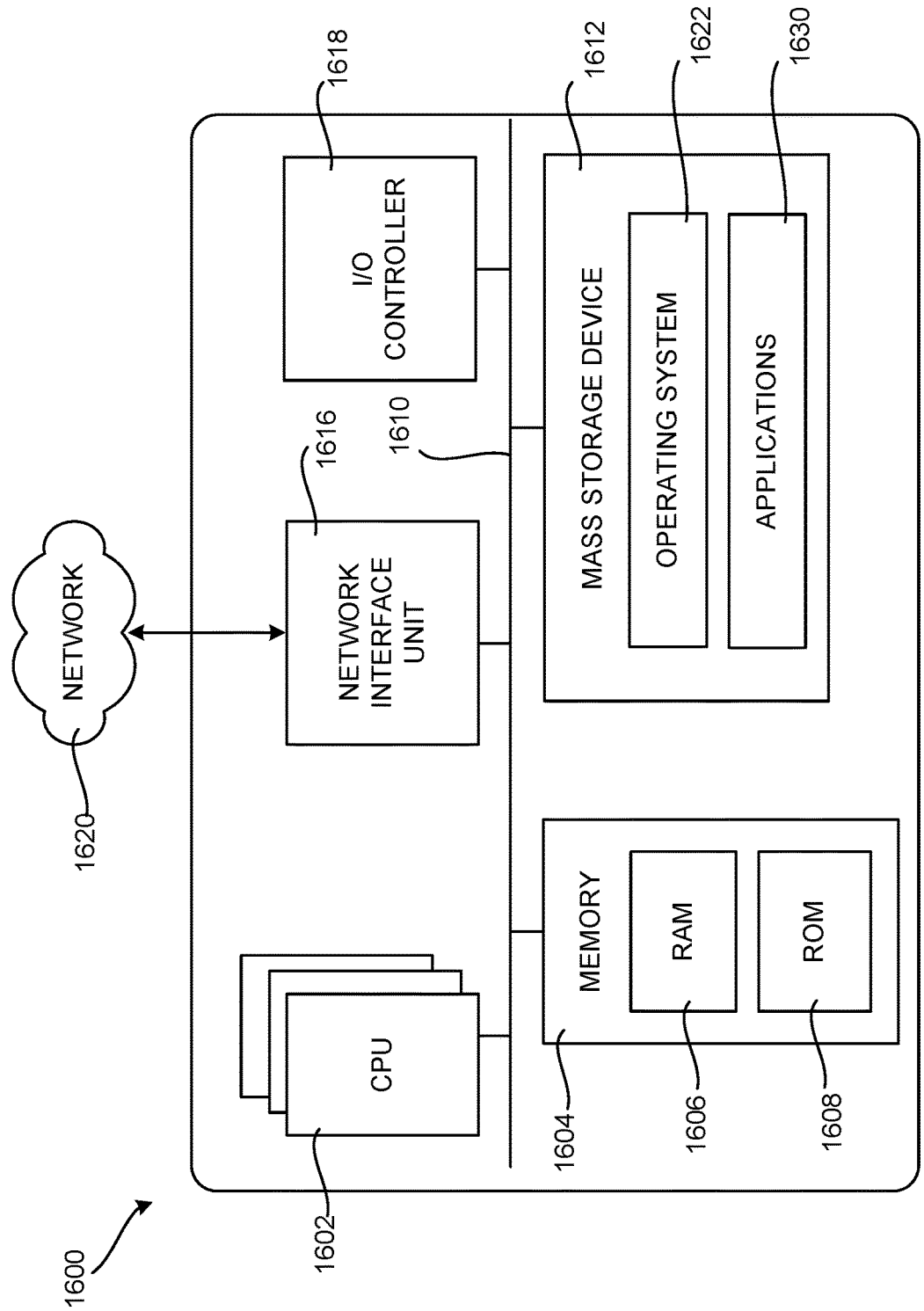
FIG. 16 is a computer architecture diagram showing an illustrative computer hardware and software architecture for a computing device that can implement aspects of the technologies presented herein.

FIG. 16 is a computer architecture diagram showing an illustrative computer hardware and software architecture for a computing device that can implement the various technologies presented herein. In particular, the architecture illustrated in FIG. 16 can be utilized to implement the hinged devices 102 and bendable devices 202 described herein. The illustrated architecture can also be utilized to implement other types of computing systems.

The computer 1600 illustrated in FIG. 16 includes a central processing unit 1602 ("CPU"), a system memory 1604, including a random-access memory 1606 ("RAM") and a read-only memory ("ROM") 1608, and a system bus 1610 that couples the memory 1604 to the CPU 1602. A basic input/output system ("BIOS" or "firmware") containing the basic routines that help to transfer information between elements within the computer 1600, such as during startup, can be stored in the ROM 1608. The computer 1600 further includes a mass storage device 1612 for storing an operating system 1622, application programs 1630, and other types of programs. The functionality described above is implemented by one or more of these programs in various configurations. The mass storage device 1612 can also be configured to store other types of programs and data.

The mass storage device 1612 is connected to the CPU 1602 through a mass storage controller (not shown) connected to the bus 1610. The mass storage device 1612 and its associated computer readable media provide non-volatile storage for the computer 1600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 1600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1600. For purposes of the claims, the phrase "computer storage medium," and variations thereof, does not include waves or signals per se or communication media.

According to various configurations, the computer 1600 can operate in a networked environment using logical connections to remote computers through a network such as the network 1620. The computer 1600 can connect to the network 1620 through a network interface unit 1616 connected to the bus 1610. It should be appreciated that the network interface unit 1616 can also be utilized to connect to other types of networks and remote computer systems. The computer 1600 can also include an input/output controller 1618 for receiving and processing input from a number of other devices, including a keyboard, mouse, touch input, a digital pen, or a physical sensor such as cameras and biometric sensors.

The computer 1600 can also be configured with a suitable video output device that can provide output to one or more display screens, such as those described above. One or more of the displays can be a touch-sensitive display that is configured to detect the presence and location of a touch. Such a display can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen is incorporated on top of a display as a transparent layer to enable a user to use one or more touches to interact with objects or other information presented on the display.

A touch-sensitive display can be configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims.

In some configurations, the computer 1600 supports a tap gesture in which a user taps a display once. A double tap gesture in which a user taps a display twice can also be supported. The double tap gesture can be used for various reasons including, but not limited to, zooming in or zooming out in stages. In some configurations, the computer 1600 supports a tap and hold gesture in which a user taps and maintains contact for at least a pre-defined time. The tap and hold gesture can be used for various reasons including, but not limited to, opening a context-specific menu.

In some configurations, the computer 1600 supports a pan gesture in which a user places a finger on a display and maintains contact with display while moving their finger. The pan gesture can be used for various reasons including, but not limited to, moving through screens, images, or menus at a controlled rate. Multiple finger pan gestures are also contemplated.

In some configurations, the computer 1600 supports a flick gesture in which a user swipes a finger in the direction the user wants the screen to move. The flick gesture can be used for various reasons including, but not limited to, scrolling horizontally or vertically through menus or pages. In some configurations, the computer 1600 supports a pinch and stretch gesture in which a user makes a pinching motion with two fingers (e.g., thumb and forefinger) or moves the two fingers apart. The pinch and stretch gesture can be used for various reasons including, but not limited to, zooming gradually in or out of a web site, map, or picture.

Although the gestures described above have been presented with reference to the use of one or more fingers for performing the gestures, other appendages such as digital pens can be used to interact with the computing device 1600. As such, the above gestures should be understood as being illustrative and should not be construed as being limiting in any way.

It should be appreciated that the software components described herein, when loaded into the CPU 1602 and executed, can transform the CPU 1602 and the overall computer 1600 from a general-purpose computing device into a special-purpose computing device customized to facilitate the functionality presented herein. The CPU 1602 can be constructed from any number of transistors or other discrete circuit elements, which can individually or collectively assume any number of states. More specifically, the CPU 1602 can operate as a finite-state machine, in response to executable instructions contained within the software modules disclosed herein. These computer-executable instructions can transform the CPU 1602 by specifying how the CPU 1602 transitions between states, thereby transforming the transistors or other discrete hardware elements constituting the CPU 1602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1600 in order to store and execute the software components presented herein. It also should be appreciated that the architecture shown in FIG. 16 for the computer 1600, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 1600 might not include all of the components shown in FIG. 16, can include other components that are not explicitly shown in FIG. 16, or can utilize an architecture completely different than that shown in FIG. 16.

It should be appreciated that the computing architecture shown in FIG. 16 has been simplified for ease of discussion. It should also be appreciated that the illustrated computing architecture can include and utilize many more computing components, devices, software programs, networking devices, and other components not specifically described herein.

The disclosure presented herein also encompasses the subject matter set forth in the following clauses:

Clause 1. A computer-implemented method, comprising: receiving a request to launch an application on a foldable computing device by way of an operating system (OS)-provided application launching surface; responsive to receiving the request to launch the application, selecting a display region of a plurality of display regions that contains the OS-provided application launching surface; and launching the application such that an application window displayed by the application is presented in the selected display region.

Clause 2. The computer-implemented method of clause 1, further comprising: detecting a selection of a display region-specific user interface (UI) control; and responsive to detecting the selection of the display region-specific (UI) control, determining if the application window is displayed in a non-active display region, and responsive to determining that the application window is displayed in the non-active display region, moving the application window to an active display region.

Clause 3. The computer-implemented method of any of clauses 1 or 2, further comprising: responsive to detecting the selection of the display region—specific (UI) control, determining if the application window is not visible within any of the plurality of display regions, and responsive to determining that the application window is not visible within any of the plurality of display regions, displaying the application window in the active display region.

Clause 4. The computer-implemented method of any of clauses 1-3, wherein the display region-specific UI control comprises an icon associated with the application that is displayed in the OS-provided application launching surface.

Clause 5. The computer-implemented method of any of clauses 1-4, wherein the OS-provided application launching surface comprises a taskbar.

Clause 6. The computer-implemented method of any of clauses 1-5, wherein the display region-specific UI control comprises a UI control in a task view UI.

Clause 7. The computer-implemented method of any of clauses 1-6, wherein the display region-specific UI control comprises a UI control in a UI for presenting notifications from the application.

Clause 8. The computer-implemented method of any of clauses 1-7, wherein the active display region comprises a display region displaying the OS-provided application launching surface.

Clause 9. A foldable computing device, comprising: one or more processors; and at least one non-transitory computer-readable storage medium having computer-executable instructions stored thereupon which, when executed by the one or more processors, cause the foldable computing device to: receive a request to launch an application on the foldable computing device by way of an operating system (OS)—provided application launching surface; responsive to receiving the request to launch the application, select a display region of a plurality of display regions that contains the OS-provided application launching surface; and launch the application such that an application window displayed by the application is presented in the selected display region.

Clause 10. The foldable computing device of clause 9, wherein the at least one non-transitory computer-readable storage medium has further computer-executable instructions stored thereupon to: detect a selection of a display region—specific user interface (UI) control; and responsive to detecting the selection of the display region—specific (UI) control, determine if the application window is displayed in a non-active display region, and responsive to determining that the application window is displayed in the non-active display region, move the application window to an active display region.

Clause 11. The foldable computing device of any of clauses 9 or 10, wherein the at least one non-transitory computer-readable storage medium has further computer-executable instructions stored thereupon to: responsive to detecting the selection of the display region-specific (UI) control, determine if the application window is not visible within any of the plurality of display regions, and responsive to determining that the application window is not visible within any of the plurality of display regions, display the application window in the active display region.

Clause 12. The foldable computing device of any of clauses 9-11, wherein the display region-specific UI control comprises an icon associated with the application that is displayed in the OS-provided application launching surface.

Clause 13. The foldable computing device of any of clauses 9-12, wherein the OS-provided application launching surface comprises a taskbar.

Clause 14. The foldable computing device of any of clauses 9-13, wherein the display region—specific UI control comprises a UI control in a task view UI.

Clause 15. A non-transitory computer-readable storage medium having computer-executable instructions stored thereupon which, when executed by a foldable computing device, cause the foldable computing device to: receive a request to launch an application on the foldable computing device by way of an operating system (OS)—provided application launching surface; responsive to receiving the request to launch the application, select a display region of a plurality of display regions that contains the OS-provided application launching surface; and launch the application such that an application window displayed by the application is presented in the selected display region.

Clause 16. The non-transitory computer-readable storage medium of clause 15, having further computer-executable instructions stored thereupon to: detect a selection of a display region-specific user interface (UI) control; and responsive to detecting the selection of the display region—specific (UI) control, determine if the application window is displayed in a non-active display region, and responsive to determining that the application window is displayed in the non-active display region, move the application window to an active display region.

Clause 17. The non-transitory computer-readable storage medium of any of clauses 15 or 16, having further computer-executable instructions stored thereupon to: responsive to detecting the selection of the display region—specific (UI) control, determine if the application window is not visible within any of the plurality of display regions, and responsive to determining that the application window is not visible within any of the plurality of display regions, display the application window in the active display region.

Clause 18. The non-transitory computer-readable storage medium of any of clauses 15-17, wherein the display region-specific UI control comprises an icon associated with the application that is displayed in the OS-provided application launching surface.

Clause 19. The non-transitory computer-readable storage medium of any of clauses 15-18, wherein the OS-provided application launching surface comprises a taskbar.

Clause 20. The non-transitory computer-readable storage medium of any of clauses 15-19, wherein the display region-specific UI control comprises a UI control in a task view UI.

Based on the foregoing, it should be appreciated that technologies for UI transitions and optimizations for foldable computing devices have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
   displaying, in a first application window, a list of selectable items adjacent to first content associated with a first selectable item in the list of selectable items, wherein the first application window is displayed in a first display region of a foldable computing device while the foldable computing device is in an unbent posture;
   detecting a selection of a second selectable item from the list of selectable items;
   in response to detecting the selection of the second selectable item, displaying, adjacent to the list of selectable items, second content associated with the second selectable item;
   detecting that the foldable computing device has transitioned from the unbent posture to a bent posture thereby causing the first display region to be divided into a second display region and a third display region separated by an artificial hardware seam;
   responsive to detecting that the foldable computing device has transitioned from the unbent posture to the bent posture:
      displaying the list of selectable items in a second application window in the second display region, wherein the second application window is displayed in a windowed state such that the second application window is smaller than the second display region; and
      displaying the second content associated with the second selectable item in a third application window in the third display region, wherein the third application window is displayed in the windowed state such that the third application window is smaller than the third display region.

2. The computer-implemented method of claim 1, wherein:
   the foldable computing device is configured to operate in a single display region mode that includes the first display region as an only display region while the foldable computing device is in the unbent posture; and
   the foldable computing device is configured to operate in a multiple display region mode that includes the second display region and the third display region while the foldable computing device is in the bent posture.

3. The computer-implemented method of claim 1, wherein the artificial hardware seam is displayed at a position associated with a hinge that enables the foldable computing device to transition from the unbent posture to the bent posture.

4. The computer-implemented method of claim 3, wherein detecting that the foldable computing device has transitioned from the unbent posture to the bent posture comprises:
   receiving, from a sensor, sensor data indicative of a hinge angle for the hinge; and
   determining, based at least in part on the sensor data, that the hinge angle satisfies a hinge angle threshold previously established for the bent posture.

5. A foldable computing device, comprising:
   one or more processors; and
   at least one computer readable storage medium having computer-executable instructions stored thereon which, when executed by the one or more processors, cause the foldable computing device to:
      display, in a first application window, a list of selectable items adjacent to content associated with a selectable item that has been selected from the list of selectable items, wherein the first application window is displayed in a first display region of a foldable computing device while the foldable computing device is in an unbent posture;
      detect that the foldable computing device has transitioned from the unbent posture to a bent posture thereby causing the first display region to be divided into a second display region and a third display region separated by an artificial hardware seam;
      responsive to detecting that the foldable computing device has transitioned from the unbent posture to the bent posture:
         display the list of selectable items in a second application window in the second display region, wherein the second application window is displayed in a windowed state such that the second application window is smaller than the second display region; and
         display the content associated with the selectable item in a third application window in the third display region, wherein the third application window is displayed in the windowed state such that the third application window is smaller than the third display region.

6. The foldable computing device of claim 5, wherein:
   the foldable computing device is configured to operate in a single display region mode that includes the first display region as an only display region while the foldable computing device is in the unbent posture; and
   the foldable computing device is configured to operate in a multiple display region mode that includes the second display region and the third display region while the foldable computing device is in the bent posture.

7. The foldable computing device of claim 5, wherein the artificial hardware seam is displayed at a position associated with a hinge that enables the foldable computing device to transition from the unbent posture to the bent posture.

8. The foldable computing device of claim 7, wherein detecting that the foldable computing device has transitioned from the unbent posture to the bent posture comprises:
receiving, from a sensor, sensor data indicative of a hinge angle for the hinge; and
determining, based at least in part on the sensor data, that the hinge angle satisfies a hinge angle threshold previously established for the bent posture.

9. At least one computer readable storage medium having computer-executable instructions stored thereon which, when executed by one or more processors, cause a foldable computing device to:
display, in a first application window, a list of selectable items adjacent to content associated with a selectable item that has been selected from the list of selectable items, wherein the first application window is displayed in a first display region of a foldable computing device while the foldable computing device is in an unbent posture;
detect that the foldable computing device has transitioned from the unbent posture to a bent posture thereby causing the first display region to be divided into a second display region and a third display region separated by an artificial hardware seam;
responsive to detecting that the foldable computing device has transitioned from the unbent posture to the bent posture:
display the list of selectable items in a second application window in the second display region, wherein the second application window is displayed in a windowed state such that the second application window is smaller than the second display region; and
display the content associated with the selectable item in a third application window in the third display region, wherein the third application window is displayed in the windowed state such that the third application window is smaller than the third display region.

10. The at least one computer readable storage medium of claim 9, wherein:
the foldable computing device is configured to operate in a single display region mode that includes the first display region as an only display region while the foldable computing device is in the unbent posture; and
the foldable computing device is configured to operate in a multiple display region mode that includes the second display region and the third display region while the foldable computing device is in the bent posture.

11. The at least one computer readable storage medium of claim 9, wherein the artificial hardware seam is displayed at a position associated with a hinge that enables the foldable computing device to transition from the unbent posture to the bent posture.

12. The at least one computer readable storage medium of claim 11, wherein detecting that the foldable computing device has transitioned from the unbent posture to the bent posture comprises:
receiving, from a sensor, sensor data indicative of a hinge angle for the hinge; and
determining, based at least in part on the sensor data, that the hinge angle satisfies a hinge angle threshold previously established for the bent posture.

\* \* \* \* \*